United States Patent
Sonoyama

(10) Patent No.: US 8,140,648 B2
(45) Date of Patent: Mar. 20, 2012

(54) INFORMATION PROCESSING APPARATUS, CONTENT MANAGEMENT METHOD AND RECORDING MEDIUM

(75) Inventor: Takuro Sonoyama, Chiba (JP)

(73) Assignee: Sony Corporation, Tokyo (JP)

( * ) Notice: Subject to any disclaimer, the term of this patent is extended or adjusted under 35 U.S.C. 154(b) by 299 days.

(21) Appl. No.: 12/622,759

(22) Filed: Nov. 20, 2009

(65) Prior Publication Data

US 2010/0174804 A1    Jul. 8, 2010

(30) Foreign Application Priority Data

Jan. 5, 2009    (JP) ................. 2009-000402

(51) Int. Cl.
G06F 15/16    (2006.01)
G06F 15/173    (2006.01)
(52) U.S. Cl. ......... 709/219; 709/217; 709/223; 709/224
(58) Field of Classification Search .................. 709/217, 709/219, 223, 224; 711/147, 165, 170
See application file for complete search history.

(56) References Cited

U.S. PATENT DOCUMENTS

| | | | | |
|---|---|---|---|---|
| 5,548,740 | A * | 8/1996 | Kiyohara | 711/170 |
| 7,047,367 | B2 * | 5/2006 | Nabekura et al. | 711/147 |
| 7,467,275 | B2 * | 12/2008 | Sakashita et al. | 711/165 |
| 7,505,955 | B2 * | 3/2009 | Watanabe et al. | 725/25 |
| 7,868,895 | B2 * | 1/2011 | Shintani | 345/530 |
| 2003/0191742 | A1 | 10/2003 | Yonezawa et al. | |
| 2006/0129514 | A1 * | 6/2006 | Watanabe et al. | 707/1 |
| 2007/0239954 | A1 * | 10/2007 | Sakashita et al. | 711/165 |

FOREIGN PATENT DOCUMENTS

| | | |
|---|---|---|
| JP | 2000-122949 | 4/2000 |
| JP | 2008-10037 | 1/2008 |

* cited by examiner

*Primary Examiner* — Quang N. Nguyen
(74) *Attorney, Agent, or Firm* — Oblon, Spivak, McClelland, Maier & Neustadt, L.L.P.

(57) ABSTRACT

There is provided an information processing apparatus including a storage unit for saving content data, a communication unit for communicating with one or more external storage devices, and a content management unit for, when receiving from the external storage device through the communication unit a notification indicating that new content data is saved in the external storage device, acquiring the new content data from the storage device through the communication unit with the notification as a trigger, and saving the new content data in the storage unit.

8 Claims, 16 Drawing Sheets

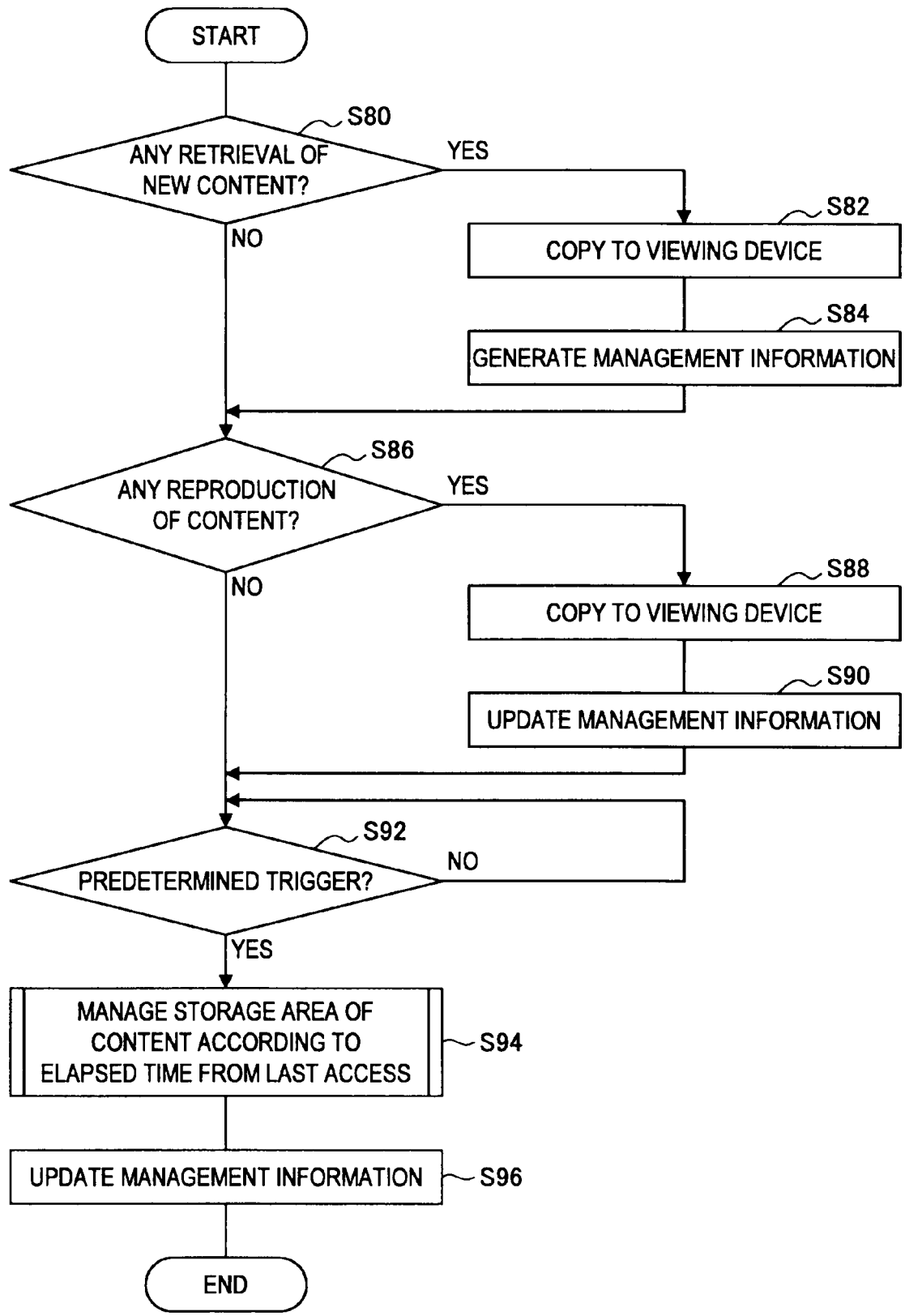

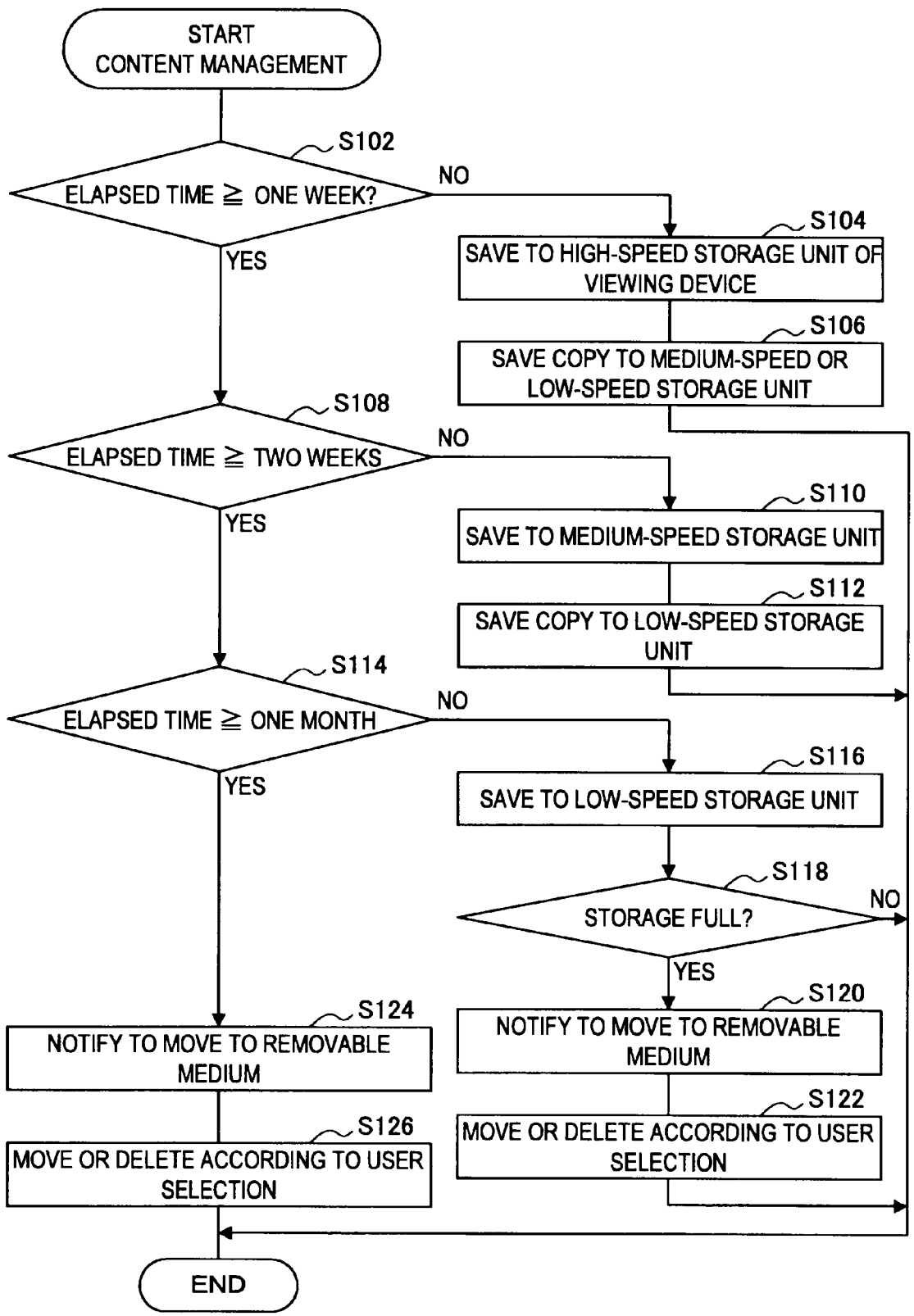

INFORMATION PROCESSING APPARATUS, CONTENT MANAGEMENT METHOD AND RECORDING MEDIUM

BACKGROUND OF THE INVENTION

1. Field of the Invention

The present invention relates to an information processing apparatus, a content management method, and a recording medium.

2. Description of the Related Art

The use of home network systems has advanced in recent years, and the usage case where the user connects a plurality of electronic devices through network in a household and shares content data among the devices is increasing. For instance, a recorder having a network storage server function has appeared, so that the content data of a television program recorded with the recorder can be transmitted to and reproduced by a reproducer, which is network connected to the recorder. Thus, in the home network system, the content data saved in a certain storage device (recorder) can be reproduced and viewed by another reproducer at a location distant from the storage device (see e.g., Japanese Patent Application Laid-Open No. 2008-10037).

FIG. 1 shows a configuration example of a home network system in the past. As shown in FIG. 1, in the home network system in the past, each storage device (e.g., home server 2, optical disc recorder 3) is connected in a star-form to a viewing device 1 such as a digital television receiver. That is, the viewing device 1 and the home server 2, as well as the viewing device 1 and the optical disc recorder 3 are respectively connected with a one-to-one network 4a, 4b and can communicate content data with each other. The home server 2 includes a hard disc drive (HDD) 2a for a storage unit, and the optical disc recorder 3 includes an HDD 3a and an optical disc drive 3b, where the content data is saved in each storage device 2, 3 in a distributed manner. When viewing the content data saved in the storage device 2, 3 with the viewing device 1 in such system, the content data is transferred from each storage device 2, 3 to the viewing device 1, and then content data is reproduced and displayed by the viewing device 1.

SUMMARY OF THE INVENTION

However, in the system of the related art, the content data are arranged in a distributed manner in the storage devices 2, 3 connected in a star-form with the viewing device 1 as a center, and the viewing device 1 and each storage device 2, 3 form a pair to execute reproduction of the content data. Thus, even when the user desires to view the content data immediately using the viewing device 1, the viewing device 1 has to access the storage device 2, 3 after the storage device 2, 3 saving the content data is started up. Therefore, the access speed with respect to the content data is slow, and the desired content data may not be rapidly reproduced and viewed. Furthermore, even if the viewing device 1 itself includes a built-in storage (not shown), saving all content data in the system in the viewing device 1 is not realistic as the data capacity of the built-in storage is limited.

In light of the foregoing, it is desirable to provide a novel and improved information processing apparatus, a content management method, and a recording medium capable of enhancing the access speed with respect to the content data.

According to an embodiment of the present invention, there is provided an information processing apparatus, including a storage unit for saving content data, a communication unit for communicating with one or more external storage devices; and a content management unit for, when receiving from the external storage device through the communication unit a notification indicating that new content data is saved in the external storage device, acquiring the new content data from the storage device through the communication unit with the notification as a trigger, and saving the new content data in the storage unit.

The information processing apparatus may include a management information storage unit for storing management information including storage area information of content data saved in at least one of the storage unit or the external storage device. The content management unit may manage a storage area of the content data in the storage unit and the external storage device based on the management information stored in the management information storage unit.

The management information further may include last access time and date information representing a last access time and date with respect to the content data by the information processing apparatus, and the content management unit may obtain an elapsed time from the last access time and date with respect to the content data based on the last access time and date information, and manage the storage area of the content data according to the elapsed time.

The external storage device may include a first external storage device, which access speed is slower than the storage unit, and the content management unit may copy or move the content data from the storage unit to the first external storage device when the elapsed time from the last access time and date with respect to the content data saved in the storage unit is greater than or equal to a predetermined first threshold value.

The external storage device may include the first external storage device and a second external storage device, which access speed is slower than the first external storage device; and the content management unit may copy or move the content data from the storage unit or the first external storage device to the second external storage device when the elapsed time from the last access time and date with respect to the content data saved in the storage unit or the first external storage device is greater than or equal to a predetermined second threshold value greater than the first threshold value.

The second external storage device can include a drive for recording data to a removable medium attached to the second external storage device, and the content management unit may move the content data from the storage unit, the first external storage device, or the second external storage device to the removable medium attached to the second external storage device or deletes the content data when the elapsed time from the last access time and date with respect to the content data saved in the storage unit, the first external storage device, or the second external storage device is greater than or equal to a predetermined third threshold value greater than the second threshold value or when a free space of the second external storage device is smaller than or equal to a predetermined value.

The external storage device may include a first external storage device, which access speed is slower than the storage unit, and a second external storage device, which access speed is slower than the first external storage device, and the content management unit may determine, when moving the content data saved in the storage unit to one of the first external storage device or the second external storage device, whether or not the content data is saved in the other one of the first or the second external storage device based on the storage area information of the management information, and deletes the content data from the storage unit after copying the content data from the storage unit to the other one of the first or the second external storage device if not saved.

When accepting a reproducing instruction on content data saved in the external storage device, the content management unit may acquire the content data, which reproducing instruction is accepted, from the external storage device through the communication unit with the reproducing instruction as a trigger, and save the content data in the storage unit.

According to another embodiment of the present invention, there is provided a content management method, including the steps of receiving, by an information processing apparatus communicable with one or more external storage devices, a notification indicating that new content data is saved in the external storage device from the external storage device, and acquiring the new content data from the external storage device with the notification as the trigger, and saving the new content data in a storage unit of the information processing apparatus by the information processing apparatus.

According to another embodiment of the present invention, there is provided a recording medium storing a program for causing an information processing apparatus communicable with one or more external storage devices to execute the steps of receiving, from the external storage device, a notification indicating that new content data is saved in the external storage device; and acquiring the new content data from the external storage device with the notification as the trigger, and saving the new content data in a storage unit of the information processing apparatus.

In this specification, "copy" means saving the content data saved in a certain storage unit into another storage unit. With such copying, the same content data will be saved in two storage units, the copy source and the copy destination. "Move" means copying the content data saved in a certain storage unit into another storage unit, and then deleting the content saved in the former storage unit. With such moving, the content data saved in the storage unit of the move source is deleted, and the content data is saved only in the storage unit of the move destination.

According to such configuration, the image information processing apparatus capable of communicating with one or more external storage devices receives, from the external storage device, a notification indicating that a new content data is saved in the external storage device, acquires the new content data from the external storage device with the notification as a trigger, and saves the same in the storage unit arranged in the information processing apparatus. The new content retrieved into the storage device thus can be copied to the information processing apparatus in advance before the reproduction of the content. Therefore, the information processing apparatus can rapidly access the content when reproducing the content.

According to the embodiments of the present invention described above, the access speed with respect to the content data can be enhanced.

BRIEF DESCRIPTION OF THE DRAWINGS

FIG. 15 is a flowchart showing the content management flow by the viewing device according to the embodiment; and FIG. 16 is a flowchart showing the content management process of S94 of FIG. 15.

DETAILED DESCRIPTION OF THE EMBODIMENTS

Figure 1:
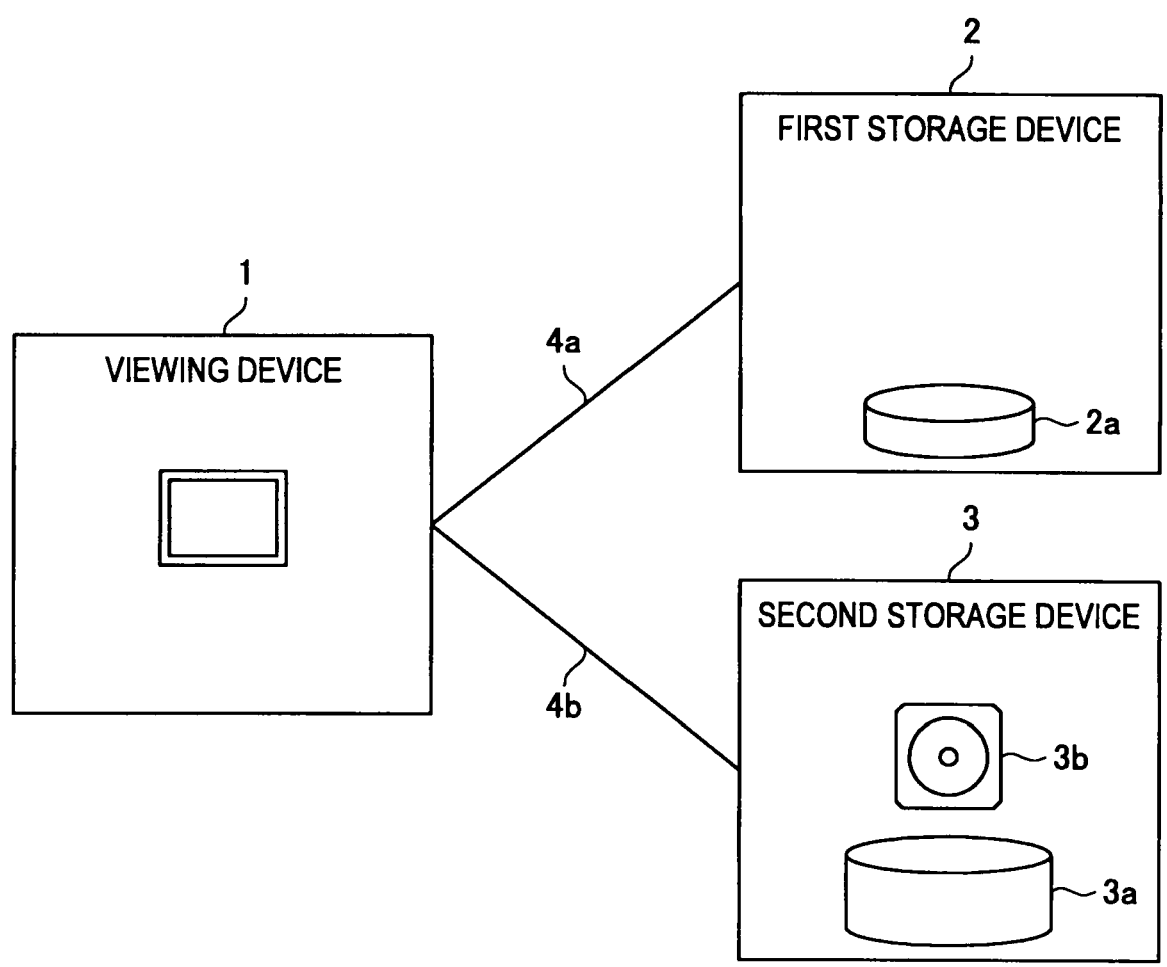
FIG. 1 is a schematic view showing a schematic configuration of a home network system of the related art.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
[1. Overall configuration of system]
[2. Configuration of viewing device]
[3. Functional configuration of viewing device and storage device]
[4. Content management function]
　[4.1 Content management when retrieving new content]
　[4.2 Content management when reproducing content]
　[4.3 Content management based on elapsed time from last access time and date]
[5. Operation flow of viewing device]
[6. Effect]

First Embodiment

Figure 2:
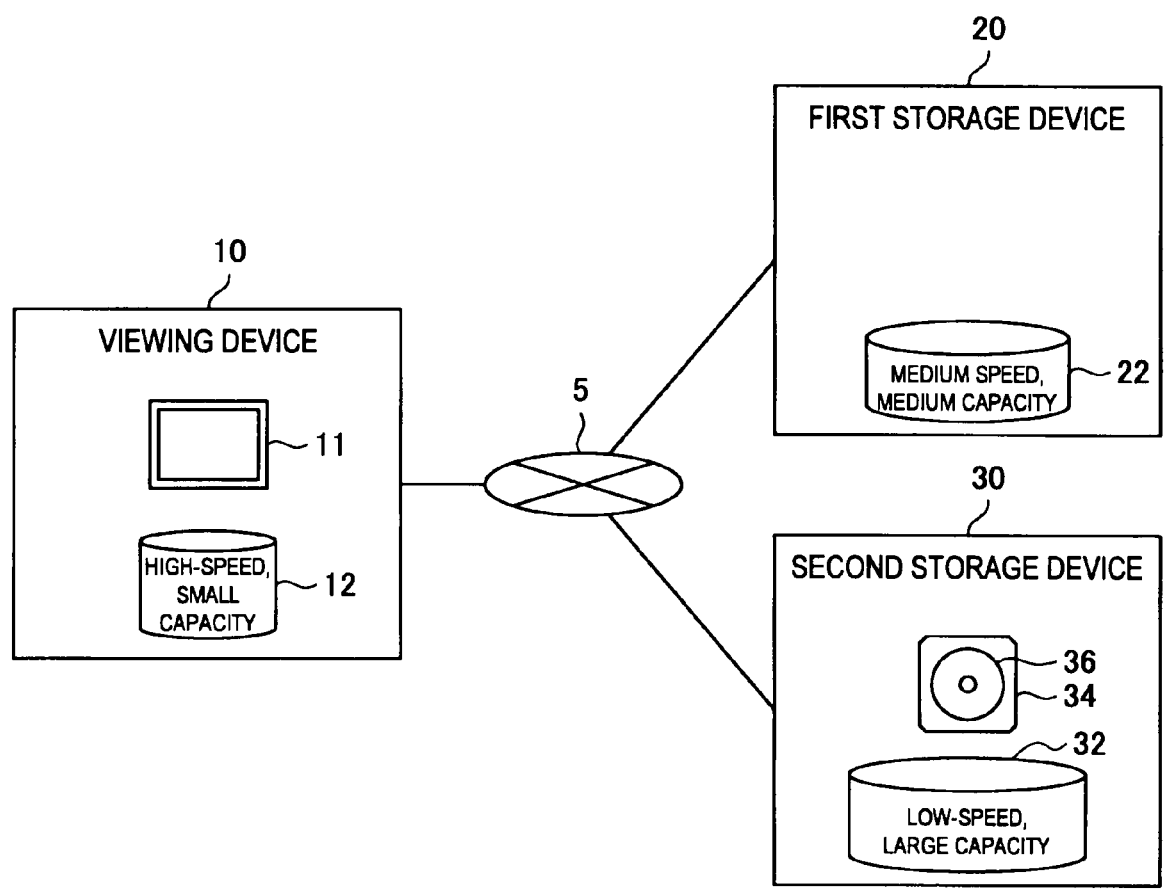
FIG. 2 is a schematic view showing a schematic configuration of a home network system according to a first embodiment of the present invention.

[1. Overall Configuration of System]
First, a schematic configuration of a home network system according to a first embodiment of the present invention will be described with reference to FIG. 2. FIG. 2 is a schematic view showing a schematic configuration of a home network system according to the present embodiment.

As shown in FIG. 2, the home network system according to the present embodiment includes at least one viewing device 10, a plurality of storage devices (first storage device 20, second storage device 30), and a network 5 for connecting the storage devices in a mutually communicable manner. The viewing device 10 serves as an information processing apparatus according to the embodiment of the present invention. The first storage device 20 serves as a first external storage device according to the embodiment of the present invention, and the second storage device 30 serves as a second external storage device according to the embodiment of the present invention.

The home network system according to the present embodiment is a communication system in which a plurality of electronic devices is connected through the network in a household of the user to share data. The home network system as shown in FIG. 2 will be described below for the communication system, by way of example, but the communication system to which the information processing apparatus and the external storage device according to the embodiment of the present invention are applied may also be applied other than to the home network installed in the household. For instance, application can be made to an arbitrary network system such as a network system installed in various types of organizations such as companies and schools, and a network system where communication can be performed between arbitrary terminals through the Internet and the like.

In the home network system according to the present embodiment, the viewing device 10 has a function for managing the storage area based on the elapsed time from the last access time and date with respect to all content data saved in the system. The present system thus functions as a content lifecycle management system for collectively managing the lifespan of the content data in the system with the viewing device 10. Each component of the present system will be described below.

The network 5 is a communication network for communicably connecting the viewing device 10, the first storage device 20 and the second storage device 30 to each other, and may be wired or wireless. In this home network system, the network 5 is configured by a LAN (Local Area Network) such as Ethernet (registered trademark), but is not limited to such example. For instance, the network 5 may be a public line network such as Internet, telephone line network, and satellite communication network, a dedicated line network such as other LAN, WAN (Wide Area Network), IP-VPN (Internet Protocol-Virtual Private Network) and the like. Such network 5 allows the viewing device 10 and the storage device 20, 30 to mutually communicate various types of data such as content data and control command.

The content data (hereinafter referred to as "content") handled by the home network system includes video/audio content such as television program, and the like. The television broadcasting program may be a program of a television broadcasting of an arbitrary method such as BS broadcasting, CS broadcasting, terrestrial digital broadcasting, terrestrial analog broadcasting, or cable broadcasting. The program contains distributed content such as IPTV (Internet Protocol Television) and VOD (Video On Demand).

The content is not limited to the content of the television program, and may be a video content including a still image or a moving image configuring a movie, a video program, a photo, a photo moving image, and the like. For instance, the content may be video data (self-recording video) or photo data imaged and recorded by the user using a digital video camera or a digital still camera. The content may also be an audio content such as music, lecture, or radio program, or an arbitrary content such as electronic library (E-book), game, or software.

The viewing device 10 is a device mainly used by the user to view the content, and is configured by a digital television receiver and the like. The viewing device 10 includes at least a display unit 11 for displaying the reproduced content, a high-speed storage unit 12 for storing the content, a communication unit (not shown) for communicating with the external device through the network 5, and a control unit (not shown).

When configuring the viewing device 10 with the television receiver (hereinafter referred to as "TV receiver"), the viewing device 10 functions as a display device and an audio output device for the user to view the video/audio content such as the television broadcasting program. The TV receiver receives the program content of the television broadcasting from a broadcasting station (not shown), through the airwave or a dedicated communication network, and displays the video of the program on a display screen. The viewing device 10 also has a network communication function for acquiring the content from the external device such as the storage devices 20, 30 through the network 5 or providing the content saved in the high-speed storage unit 12 to the external device.

The storage device 20, 30 has a function for storing data to a predetermined recording medium and a communication function through the network 5. The storage device 20, 30 provides the content to the viewing device 10 through the network 5, or acquires the content saved in the viewing device 10 or another external device through the network 5 and saves the relevant content in the own device.

Specifically, the first storage device 20 is a recording device having a storage function for storing the data in a built-in medium-speed storage unit 22. The first storage device 10 is configured by a home server, an externally attached HDD, a digital camera, a portable telephone, a USB (Universal Serial Bass) memory, and the like. The first storage device 20 includes at least the medium-speed storage unit 22 for storing contents, a communication unit (not shown) for communicating with the external device through the network 5, and a control unit (not shown).

The second storage device 30 is a recording device having a storage function for storing the data in a built-in low-speed storage unit 32, and a storage function for storing the data in a removable medium 36. The removable medium 36 is a recording medium removable with respect to the second storage device 30, and may be an optical disc such as BD (Blu-ray Disc), DVD (digital versatile disk), CD (Compact Disk), or a semiconductor memory device such as memory card.

The second storage device 30 is configured by a universal device including an optical disc recorder (e.g., BD recorder, DVD recorder, CD recorder, etc.), an HDD recorder, a recording/reproducing device such as a complex machine thereof, or a personal computer. The second storage device 30 includes at least the low-speed storage unit 32 for storing contents, a drive 34 for recording/reproducing contents with respect to the removable medium 36, a communication unit (not shown) for communicating with the external device through the network 5, and a control unit (not shown).

The difference among the viewing device 10, the first storage device 20, and the second storage device 30 will be described. The viewing device 10 includes a display unit 11 mainly used by the user to view contents, which display unit 11 is a large-screen display suited for viewing video contents if the viewing device 10 is a digital TV receiver. In this case, the user views the content in the system mainly using the viewing device 10 even if the storage devices 20, 30 are equipped with a small display device (e.g., liquid crystal display for optical disc recorder, PC monitor etc.).

The viewing device 10, and the storage devices 20, 30 respectively include a control unit thereby enabling an independent control. The control unit is configured by a CPU (Central Processing Unit), a ROM (Read Only Memory), a RAM (Random Access Memory), and the like. With such control unit, the viewing device 10 and the storage devices 20, 30 can provide the content saved in each device to another device, delete the content, or acquire the content from another device. When viewing the content with the viewing device 10, the viewing device 10 functions as a master that controls each storage device 20, 30.

Each of the viewing device 10, and the storage devices 20, 30 also includes a built-in storage unit 12, 22, 32. The storage unit 12, 22, 32 is configured by a HDD, and the like, may also be configured by an arbitrary storage device such as a semiconductor memory or an optical disc drive. The second storage device 30 also includes a separate storage unit (drive 34) for recording data to the removable medium 36.

The access speed from the viewing device 10 to the storage unit 12, 22, 32, and the data storage capacity of the storage unit 12, 22, 32 are compared for the viewing device 10, the first storage device 20, and the second storage device 30. The viewing device 10 includes the high-speed storage unit 12 of high-speed and small capacity. The first storage device 20 includes the medium-speed storage unit 22 of medium speed and medium capacity. The second storage device 30 includes the low-speed storage unit 32 of medium and low-speed and large capacity, and the drive 34, which is a removable storage, having high reliability for storing data to the removable medium 36.

In the present embodiment, the access speed when the viewing device 10 accesses the content stored in the storage unit 12, 22, 32 of each device is high in the order of the viewing device 10 (high-speed), the first storage device 20 (medium-speed), and the second storage device 30 (middle to low-speed). The data storage capacity is large in the order of the second storage device 30 (large capacity), the first storage device 20 (middle capacity), and the viewing device 10 (small capacity).

If the access speed and the data storage capacity are in the above relationship, the content having high viewing frequency of the user is preferably saved in the viewing device 10 or the first storage device 20, in particular, to the viewing device 10 rather than in the second storage device 30 from the standpoint of access speed (real time property). The content having low viewing frequency of the user is preferably stored in the second storage device 30 or the first storage device 20, in particular, to the second storage device 30 rather than in the viewing device 10 from the standpoint of restriction of the data storage capacity of the viewing device 10 and the efficiency of saving great number of contents.

Thus, in the home network system including the viewing device 10 and the storage devices 20, 30 shown in FIG. 2, which content to save in which device is important when sharing the content among the devices. Prior to describing the characteristics of the home network system (FIG. 2) according to the present embodiment, the issues in the method of saving and using the content in the home network system (FIG. 1) of the related art will be described in detail.

As described above, the storage devices 2, 3 are connected in a star-form with the viewing device 1 as the center, and the content is arranged in each storage device 2, 3 in a distributed manner in the home network system of the related art shown in FIG. 1. When viewing the content in the system, the contents saved in the storage devices 2, 3 are transferred to the viewing device 1 and then reproduced, and hence the viewing device 1 and each storage device 2, 3 are to cooperatively operate at any time. Therefore, the home network system of the related art shown in FIG. 1 has various issues as mentioned below.

Firstly, the viewing device 1 has to access the storage device 3 after waiting for the storage devices 2, 3, which are saving the content, to start up even if the user desires to immediately view the content using the viewing device 1. Thus, the access to the content becomes slow, and it takes time until the start of viewing.

Secondly, the safety of the content saved in the system depends only on the reliability of the storage devices 2, 3, and the content may disappear due to breakdown of the storage devices 2, 3. If the content is saved only in the storage device 2, for example, the user may not be able to retrieve the content if the storage device 2 breaks down.

Thirdly, the storage device 2 and the storage device 3 each have a free space, and the free space of each device is managed only separately. Thus, the free space may not be efficiently used in the system as a whole.

Fourthly, the user of the viewing device 1 may not manage his/her own content in the system with a unified interface since all contents saved in the storage devices 2, 3 are not unify managed. For instance, the content of each storage device 2, 3 is managed individually according to the type of content (e.g., analog input, external input etc.), the specification of the storage device 2, 3, and the like.

Fifthly, both the viewing device 1 and the storage device 2 (or 3) are to be operated when reproducing the content. Since both devices are to be started, the power consumption in the entire system becomes the sum of the power consumptions of the viewing device 1 and the storage device 2. Therefore, the power consumption increases, and the energy efficiency becomes inefficient compared to when reproducing the content saved in the viewing device 1.

The home network system of the related art shown in FIG. 1 has the issues described above. The home network system according to the present embodiment shown in FIG. 2 has a characteristic solving means for solving such issues, which solving means will be described in detail below.

[2. Configuration of Viewing Device]

Figure 3:
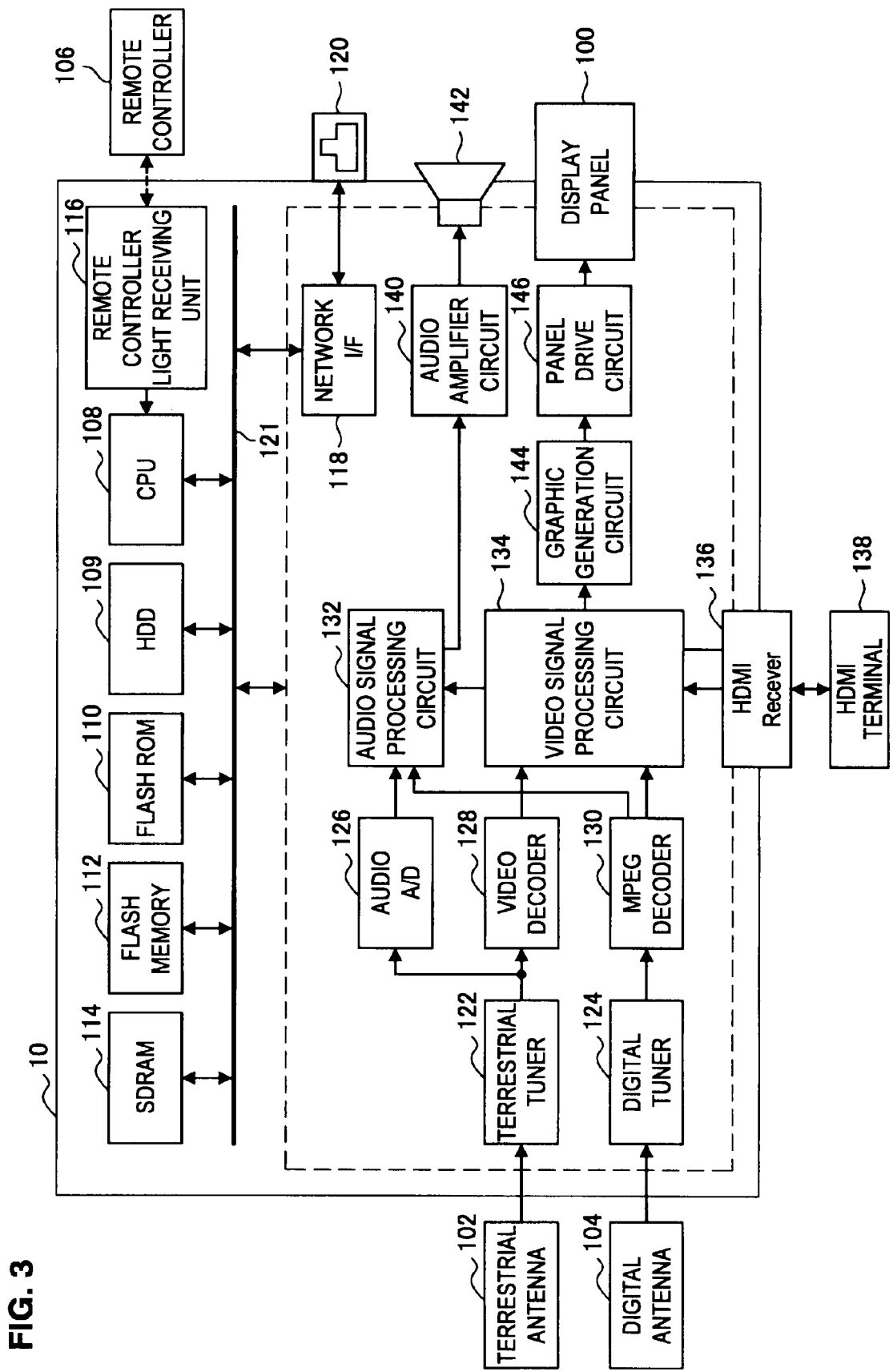
FIG. 3 is a block diagram showing an example of a hardware configuration of a viewing device according to the embodiment.

An example of a hardware configuration of the viewing device 10, which is the information processing apparatus according to the present embodiment, will be described with reference to FIG. 3. FIG. 3 is a block diagram showing an example of a hardware configuration of the viewing device 10 (e.g., digital TV receiver) according to the present embodiment.

As shown in FIG. 3, the digital TV receiver serving as the viewing device 10 includes a display panel 100, a CPU 108, a HDD 109, a flash ROM 110, a flash memory 112, an SDRAM (Synchronous Dynamic RAM) 114, a remote controller light receiving unit 116, a network I/F 118, a network terminal 120, a terrestrial tuner 122, a digital tuner 124, an audio A/D conversion circuit 126, a video decoder 128, an MPEG decoder 130, an audio signal processing circuit 132, a video signal processing circuit 134, an HDMI (High-Definition Multimedia Interface) receiver 136, an HDMI terminal 138, an audio amplifier circuit 140, a speaker 142, a graphic generation circuit 144, and a panel drive circuit 146.

The HDD 109 corresponds to the high-speed storage unit 12 (storage unit according to the embodiment of the present invention) described above. The flash memory 112 corresponds to a management information storage unit according to the embodiment of the present invention. The CPU 108 corresponds to the control unit (content management unit according to the embodiment of the present invention) described above. The network I/F 118 and the network terminal 120 correspond to the communication unit (communication unit according to the embodiment of the present invention) described above. Each unit of FIG. 3 will be specifically described below.

The terrestrial tuner 122 receives the broadcasting wave signal transmitted from the terrestrial antenna 102 for receiving the analog ground wave, and demodulates the video signal and the audio signal contained in the broadcasting wave signal to baseband signals. Among the baseband signals demodulated by the terrestrial tuner 122, the audio signal is transmitted to the audio A/D conversion circuit 126 and the video signal is transmitted to the video decoder 128.

The digital tuner 124 receives the broadcasting wave signal transmitted from the digital antenna 104 for receiving the digital broadcasting, and converts the received broadcasting wave signal to MPEG2-TS (MPEG2 Transport Stream). The converted MPEG2-TS is transmitted to the MPEG decoder 130.

The audio A/D conversion circuit 126 receives the analog audio signal demodulated by the terrestrial tuner 122, and converts the analog audio signal to a digital audio signal. The converted digital audio signal is then transmitted to the audio signal processing circuit 132.

The video decoder 128 receives the video signal demodulated by the terrestrial tuner 122, and converts the analog video signal to a digital component signal. The converted digital component signal is then transmitted to the video signal processing circuit 134.

The MPEG decoder 130 receive the MPEG2-TS transmitted from the digital tuner 124, and converts the MPEG2-TS to a digital audio signal for audio and converts the MPEG2-TS to a digital component signal for video. The converted digital audio signal is transmitted to the audio signal processing circuit 132, and the converted digital component signal is transmitted to the video signal processing circuit 134.

The audio signal processing circuit 132 receives the digital audio signal transmitted from the audio A/D conversion circuit 126 and the MPEG decoder 130, and performs signal processing on the relevant digital audio signal. The signal processed audio signal is transmitted to the audio amplifier circuit 140.

The audio amplifier circuit 140 receives the audio signal output from the audio signal processing circuit 132, amplifies the audio signal by a predetermined amount, and outputs the amplified audio signal. The amplification amount in the audio amplifier circuit 140 corresponds to the volume instructed by the user of the viewing device 10. The audio signal amplified by the audio amplifier circuit 140 is transmitted to the speaker 142. The speaker 142 outputs audio based on the audio signal transmitted from the audio amplifier circuit 140.

The video signal processing circuit 134 receives the digital component signal transmitted from the video decoder 128 and the MPEG decoder 130, and performs signal processing on the digital component signal. The signal processed digital component signal is transmitted to the graphic generation circuit 144.

The HDMI receiver 136 receives a digital baseband signal input from the HDMI terminal 138, which is one of the external input terminals. The digital baseband signal received by the HDMI receiver 136 is transmitted to the audio signal processing circuit 132 and the video signal processing circuit 134, and signal processing is performed on the audio signal and the digital component signal.

The graphic generation circuit 144 generates a graphic screen (e.g., operation menu screen of extension function) that is desired for the operation of the viewing device 10. Different graphic screens, desired for the operation of the viewing device 10, are generated depending on the operation of the user. The graphic screen generated by the graphic generation circuit 144 is superimposed on the video signal transmitted from the video signal processing circuit 134 or is replaced with the video signal, and then transmitted to the panel drive circuit 146. If the graphic screen is not generated, the video signal transmitted from the video signal processing circuit 134 may be passed to the panel drive circuit 146 as is.

The panel drive circuit 146 generates a panel drive signal, which is desired for displaying video on the display panel 100, from the video signal transmitted from the graphic generation circuit 144. The panel drive signal generated by the panel drive circuit 146 is transmitted to the display panel 100, so that the display panel 100 operates according to the panel drive signal and displays the video.

The display panel 100 displays images (moving image or still image) based on the panel drive signal transmitted from the panel drive circuit 146. The display panel 100 is configured by an LCD (Liquid Crystal Display) and the like, but PDP (Plasma Display Panel), and organic EL (Electro-Luminescence) panel may also be used.

The CPU 108 functions as a control unit for controlling each unit of the viewing device 10. The CPU 108 reads out and sequentially executes the computer program stored in the flash ROM 110 to control each unit of the viewing device 10. The CPU 108 also reads out the computer program of extension function application software stored in the flash memory 112 and executes the program. The extension function such as content management function then can be realized in the viewing device 10. The flash ROM 110 stores computer programs for the CPU 108 to control each unit of the viewing device 10. The flash memory 112 is a memory that can be freely read from and written to, and stores the computer program of the extension function application software and the management information for managing the storage area of the content in the system. The SDRAM 114 is a temporary work region when the CPU 108 executes each computer program mentioned above.

The management information is information for managing the storage area of the content in the system. The content in the system includes all contents saved in the high-speed storage unit 12 (e.g., HDD 109) of the viewing device 10, the medium-speed storage unit 22 of the first storage device 20, and the low-speed storage unit 32 or the removable medium 36 of the second storage device 30. The details of the management information will be described afterwards. The CPU 108 functions as a content management unit for managing the storage area of the content in the system using such management information.

When accepting a viewing request (input operation instructing reproduction of content desired by user) from the user, the CPU 108 controls each unit of the viewing device 10 so as to reproduce and output (display or audio output) the user specified content. In this case, the user selects an arbitrary content in the system, that is, an arbitrary content saved in the viewing device 10 or the storage devices 20, 30, and requests for viewing (reproducing instruction) of the content to the viewing device 10.

The HDD 109 functions as a high-speed storage unit 12 of the viewing device 10. The HDD 109 records/reproduces various types of information in the hard disc, which is a recording medium. The CPU 108 can save the content acquired from the external storage devices 20, 30 to the HDD 109, or provide the content saved in the HDD 109 to the external storage devices 20, 30.

The remote controller light receiving unit 116 receives signals transmitted from the remote controller 106, which is one example of an operation unit of the viewing device 10. The signal received by the remote controller light receiving unit 116 is input to the CPU 108. The CPU 108 deciphers the control code contained in the signal, and controls each unit of the viewing device 10 to carry out the operation corresponding to the control code (specification of content, recordation, reproduction, stop of reproduction, and fast forwarding of content, adjustment of volume, setting of channel, display of operation menu, and the like).

The network I/F 118 is a communication interface configured by a communication device and the like for connecting to the network 5. The network I/F 118 functions as a communication unit according to the embodiment of the present invention, and transmits and receives various types of data such as content with an external device having the network communication function such as the storage devices 20, 30 through the network 5. For instance, when receiving the content through the network 5, the network I/F 118 sends the received content to the CPU 108. The CPU 108 saves the content acquired through the network 5 in the HDD 109, and the like. Furthermore, the CPU 108 can also reproduce the content acquired through the network 5, and display the same on the display panel 100 or audio output the same from the speaker 142, similar to the reproduction, displaying, and audio outputting process of the video and audio signals of the TV broadcasting. The CPU 108 reads out the content saved in the HDD 109, and sends the same to the network I/F 118. The network I/F 118 transmits the content to the storage devices 20, 30 through the network 5.

Each unit of the viewing device 10 is connected to each other with the internal bus 121, so that each unit of the viewing device 10 can be controlled by the CPU 108. The viewing device 10 and the remote controller 106 may wirelessly communicate with each other. An input unit including a button, a dial, and the like for user operation may be arranged in the body of the viewing device 10.

The storage device 20, 30 can be configured by an electronic device having a network communication function and a storage function such as a generally used home server, an optical disc recorder, or a personal computer. Such a storage device 20, 30 may adopt a hardware configuration generally used in such electronic device, and hence the detailed description thereof will be omitted. The storage device 20, 30 includes the storage units 22, 32 (e.g., HDD), the drive 34 for the removable medium 36, the control unit (e.g., CPU, ROM, RAM) and the communication unit (e.g., network I/F etc.).

[3. Functional Configuration of Viewing Device and Storage Device]

Figure 4:
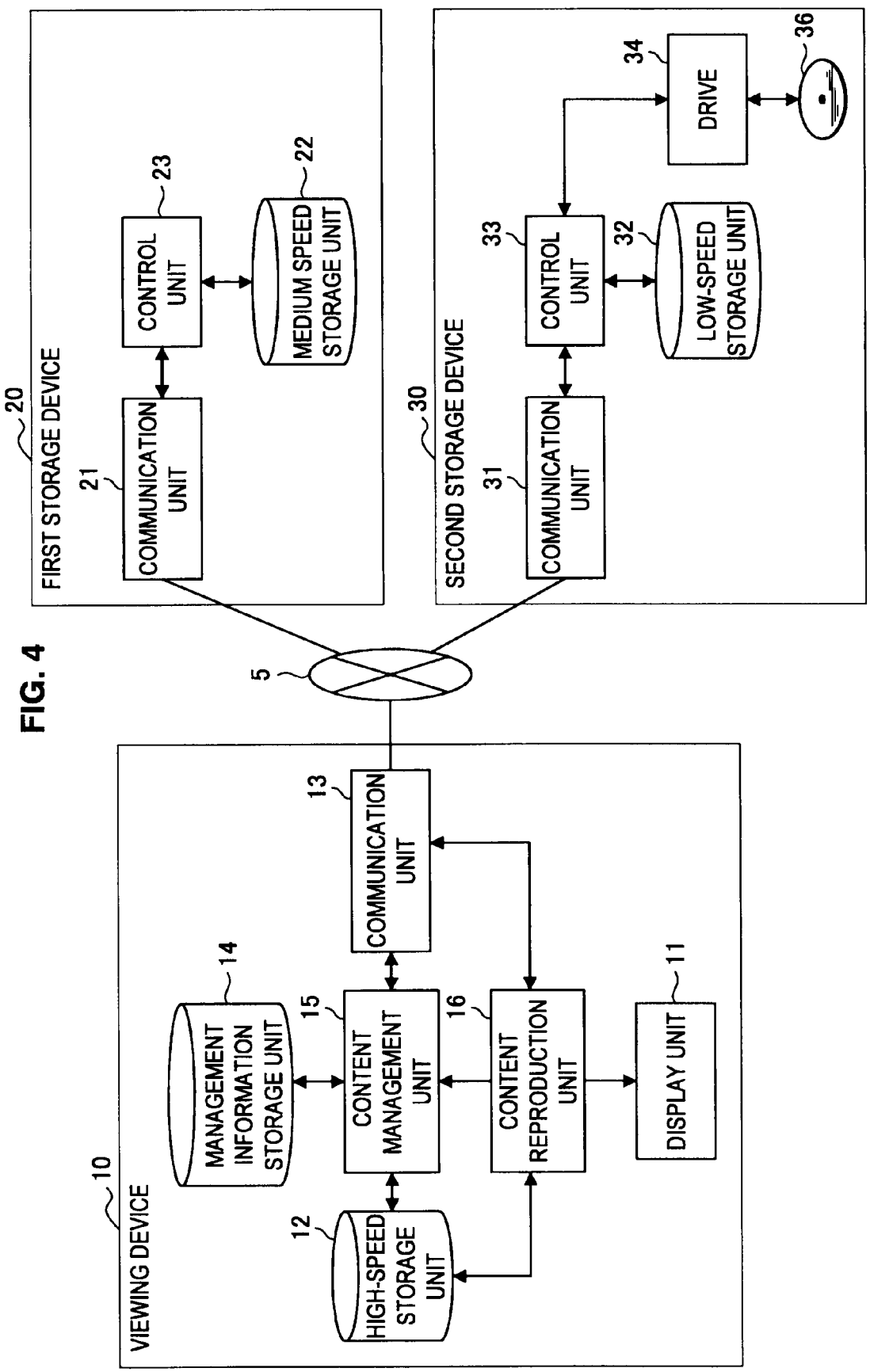
FIG. 4 is a block diagram showing the function configuration of the viewing device and storage devices according to the embodiment.

The function configuration of the viewing device 10 and the storage devices 20, 30 according to the present embodiment will now be described with reference to FIG. 4. FIG. 4 is a block diagram showing the function configuration of the viewing device 10 and the storage devices 20, 30 according to the present embodiment.

As shown in FIG. 4, the viewing device 10 and a plurality of storage devices 20, 30 are connected so as to be communicable with each other through the network 5. The viewing device 10 includes the display unit 11, the high-speed storage unit 12, a management information storage unit 14, a content management unit 15, and a content reproduction unit 16. The first storage device 20 includes a communication unit 21, the medium-speed storage unit 22, and a control unit 23. The second storage device 30 includes a communication unit 31, the low-speed storage unit 32, a control unit 33, and the drive 34.

The control management unit 15 of the viewing device 10 and the control units 23, 33 of the storage devices 20, 30 are implemented by installing the program for executing the function of each units in the viewing device 10 or the storage devices 20, 30. Such programs can be provided to the viewing device 10 or the storage devices 20, 30 by way of an arbitrary communication medium or a storage medium, and installed thereto. Each unit will be hereinafter described in detail.

First, each unit of the viewing device 10 will be described. The display unit 11 is configured by the display panel 100 and the like, and displays the content reproduced by the content reproduction unit 16. The high-speed storage unit 12 stores the content acquired from the storage devices 20, 30 according to the control by the content management unit 15. The communication unit 13 communicates various types of information such as content, control information, and management information with the storage devices 20, 30 through the network 5. The management information storage unit 14 stores the management information on the content saved in the viewing device 10 and the storage devices 20, 30. The content management unit 15 manages the storage area of the content in the high-speed storage unit 12 of the viewing device 10 and the storage units 22, 32 of the storage devices 20, 30 based on the management information stored in the management information storage unit 14.

Each unit of the first storage device 20 will now be described. The communication unit 21 communicates various types of information such as content and control information, and the like with the viewing device 10 or the second storage device 30 through the network 5. The medium-speed storage unit 22 stores content acquired from the viewing device 10 or the second storage device 30 and content newly acquired from the outside, and reads out the content saved inside and sends the same to the control unit 23 according to the control by the control unit 23. The control unit 23 controls each unit of the first storage device 20.

Each unit of the second storage device 30 will now be described. The communication unit 31 communicates various types of information such as content and control information, and the like with the viewing device 10 or the first storage device 20 through the network 5. The low-speed storage unit 32 stores content acquired from the viewing device 10 or the first storage device 20 and content newly acquired from the outside according to the control by the control unit 33. The control unit 33 controls each unit of the second storage device 30. The drive 34 records the content acquired from the viewing device 10 or the first storage device 20 and content newly acquired from the outside in the removable medium 36 according to the control by the control unit 33. The drive 34 also reads out the content saved in the removable medium 36 and sends the same to the control unit 33, or deletes the relevant content according to the control by the control unit 33.

The control units 23, 33 of the storage devices 20, 30 can acquire the content newly acquired from the outside and store the same in the storage units 22, 32. For instance, the second storage device 30 such as an optical disc recorder can record a program content of the externally input TV broadcasting, and save the same in the medium-speed storage unit 22. If connected with an external device, the control units 23, 33 of the storage devices 20, 30 can also acquire the content externally input from the external device and store the same in the storage units 22, 32. Such external device may be a digital still camera, a digital video camera, a portable telephone, a portable video/audio player/recorder etc. The control unit 33 of the second storage device 30 can acquire the content saved in the removable medium 36 using the drive 34, and store the same in the storage unit 32. The control units 22, 32 of the storage devices 20, 30 having the network communication function can download contents from the external device such as a network server (content distribution server etc.) through the network 5 and other communication networks, and store the same in the storage units 22, 32. The viewing device 10 can also acquire new contents from the outside and store the same in the high-speed storage unit 12, similar to the above.

The viewing device 10 or the storage device 20, 30 acquires a new content (TV program content, self-recording content, distribution content, etc.) from outside the system and saves the same in the storage unit 12, 22, 32 in the above manner. The new content is thereby retrieved into the home network system.

The content management unit 15 of the viewing device 10 generates and updates the management information on all contents retrieved into the system in such manner to unify manage all contents. In other words, when the viewing device 10, or the storage device 20, 30 saves a new content, the content management unit 15 generates the management information on such content and saves the same in the management information storage unit 14. When the storage area of the content is changed such as when the content is copied or moved between the devices or when the content is deleted, the content management unit 15 updates the management information on the content in the management information storage unit 14. The content management unit 15 also updates the management information on the content in the management information storage unit 14 when the content saved in the storage unit 12, 22, 32 is reproduced in response to the reproducing instruction from the user.

Figure 5:
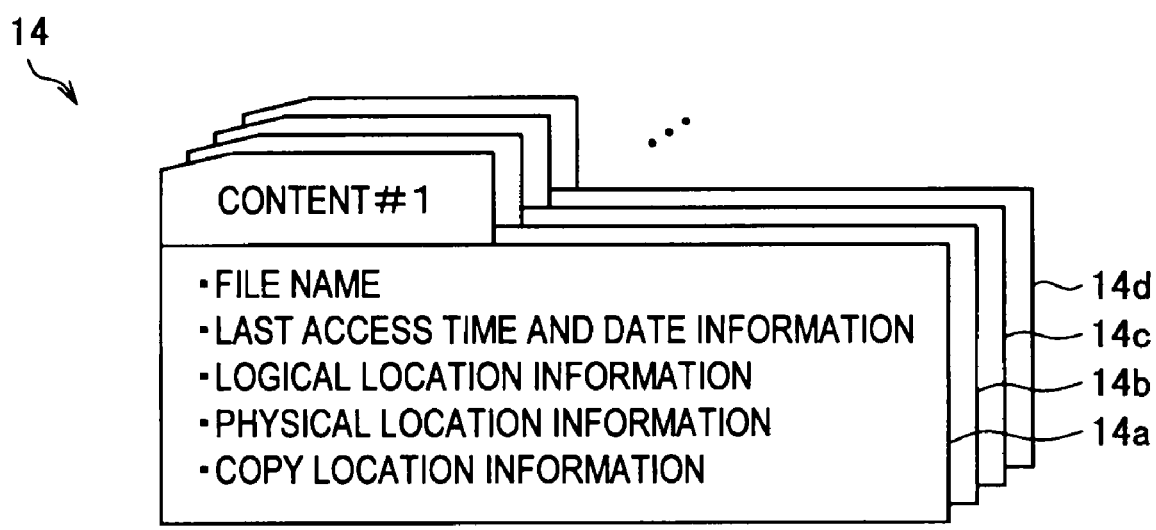
FIG. 5 is an explanatory view showing a specific example of management information according to the embodiment.
Figure 6:
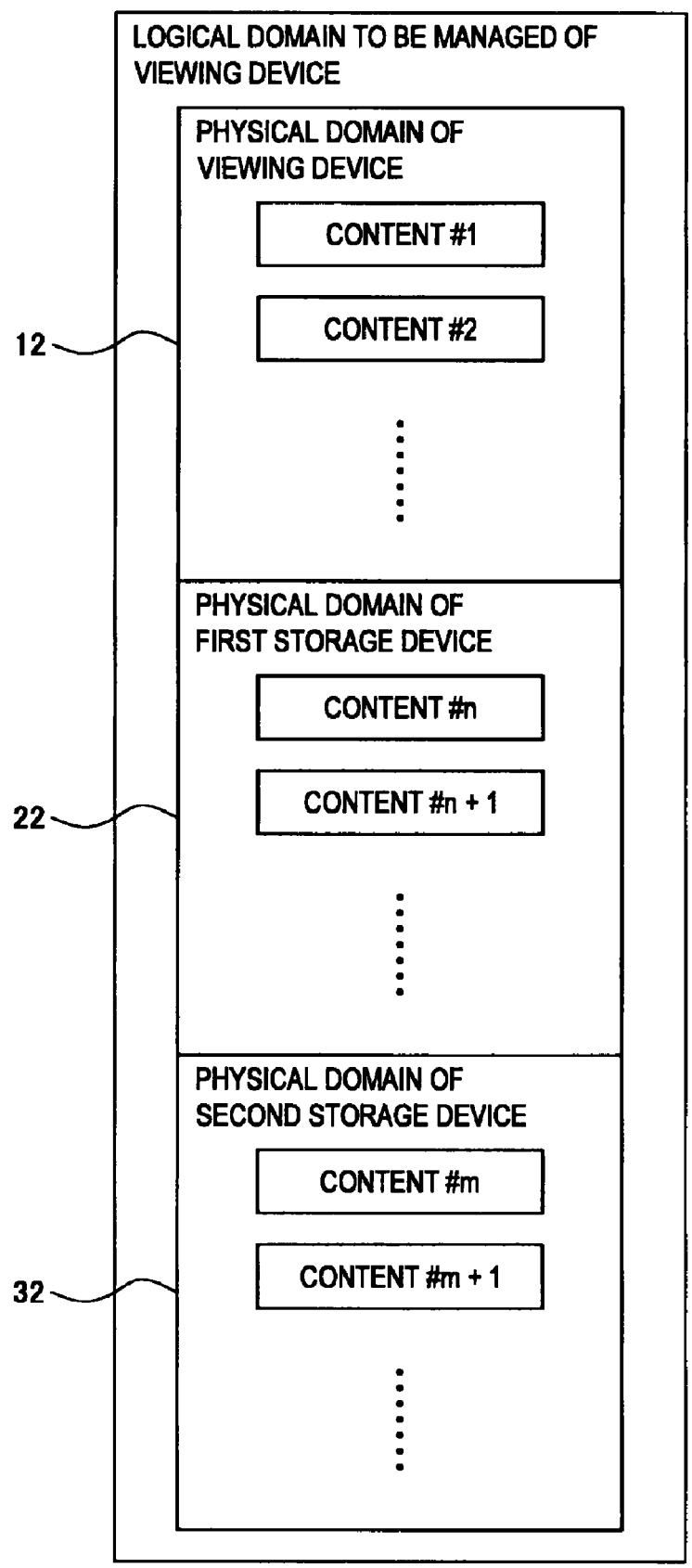
FIG. 6 is a schematic view conceptually showing a storage area of the content according to the embodiment.

The management information according to the present embodiment will be described in detail below with reference to FIGS. 5 and 6. FIG. 5 is an explanatory view showing a specific example of the management information according to the present embodiment. FIG. 6 is a schematic view conceptually showing the storage area of the content according to the present embodiment.

As shown in FIG. 5, the management information storage unit 14 saves the management information 14a, 14b, 14c, 14d, . . . on all contents saved in the viewing device 10 or the storage devices 20, 30. The management information 14a to 14d of the content are information for managing the storage area of the content in the network system. Such management information 14a to 14d of the content includes identification information on the content storage area information, and last access time and date information on the content by the viewing device. The identification information on the content is identification information uniquely given to each content to identify the content, and includes file name, content ID, and the like. The storage area information on the content is information representing the saving destination of the content in the home network system, and includes logical address, physical address, and the like. The management information storage unit 14 for storing such management information functions as a database for the viewing device 10 to unify manage all contents saved in the system.

A specific example of the management information shown in FIG. 5 will be described in more detail below. As shown in FIG. 5, the management information 14a to 14d of each content includes the file name of the content, the last access time and date information, the storage area information on the content (logical location information, physical location information), and the copy location information on the content.

The file name of the content is an example of the identification information on the content, and various types of information capable of identifying the content such as the content ID and the title of the content may be used instead of the file name.

The last access time and date information is information representing the date and/or time the viewing device 10 accessed the content the last. The content management unit 15 of the viewing device 10 obtains an elapsed time from the last access time and date with respect to the content by referencing such last access time and date information, and manages the storage area of the content in the system according to the elapsed time.

The storage area information on the content includes the logical location information (e.g., logical domain) and the physical location information (e.g., physical domain). The concept of the logical location information (logical domain) and the physical location information (physical domain) will be described with reference to FIG. 6. FIG. 6 shows a state in which the contents 1, 2, . . . are saved in the high-speed storage unit 12 of the viewing device 10, the contents n, n+1, . . . are saved in the medium-speed storage unit 22 of the first storage device 20, and the contents m, m+1, . . . are saved in the low-speed storage unit 32 of the second storage device 30.

As shown in FIG. 6, the logical location information (logical domain) is identification information given for every unit (Allocation Logical Unit) of the storage region that becomes the management target by one viewing device 10 (master). In the home network system shown in FIG. 2, the storage region that becomes the management target of the viewing device 10 is the storage units 12, 22, 23 in the viewing device 10 and the two storage devices 20, 30. As shown in FIG. 6, one logical location information (logical domain) is given with respect to the relevant storage regions.

The physical location information (physical domain) is identification information given for every unit (Allocation Physical Unit) of the physical storage where the contents are stored, and is a device ID given for every physical storage unit, and the like. In the home network system shown in FIG. 2, the storage units 12, 22, 32 are the physical storage. Thus, in the example shown in FIG. 6, the physical domain is given to each of the high-speed storage unit 12 of the viewing device 10, the medium-speed storage unit 22 of the first storage device 20, and the low-speed storage unit 32 of the second storage device 30. In other words, three physical domains corresponding to the respective storage units 12, 22, 32 are arranged in the logical domain that becomes the management target of the viewing device 10.

The copy location information (Copy Allocation Information) of the contents is information indicating the storage area of the copy destination when the content is copied among the devices in the system, that is, among the storage units 12, 22, 32. As hereinafter described, the content management unit 15 according to the present embodiment copies the content among the devices, but can easily manage the storage area of the content by storing the copy location information corresponding to the relevant copy as management information.

The viewing device 10 holds the management information on all contents in the home network system described above in the management information storage unit 14. The content management unit 15 of the viewing device 10 manages the storage areas of all contents based on the elapsed time from the last access time and date, and the like according to the management information. Further, the content management unit 15 generates and updates the management information stored in the management information storage unit 14 according to the management of the storage area. For instance, if a new content is retrieved into the system, the management information including the identification information on the new content, the storage area, and the last access time and date are newly generated, and stored in the management information storage unit 14. When the storage area of the content is changed (copy, move, delete, etc.), the content management unit 15 rewrites the storage area information and the copy location information on the relevant content in the management information storage unit 14 to a new storage area, and updates the management information. When the content reproduction unit 16 accesses the content in the storage units 12, 22, 32 and reproduces the content in response to the reproducing instruction of the user, the content management unit 15 updates the last access time and date information on the content to the reproducing time and date (access time and date). The management of the storage area of the content will be described in detail in the next section.

[4. Content Management Function]

The management function of the content by the content management unit 15 of the viewing device 10 according to the present embodiment will now be described in detail.

[4.1 Content Management When Retrieving New Content]

Figure 7:
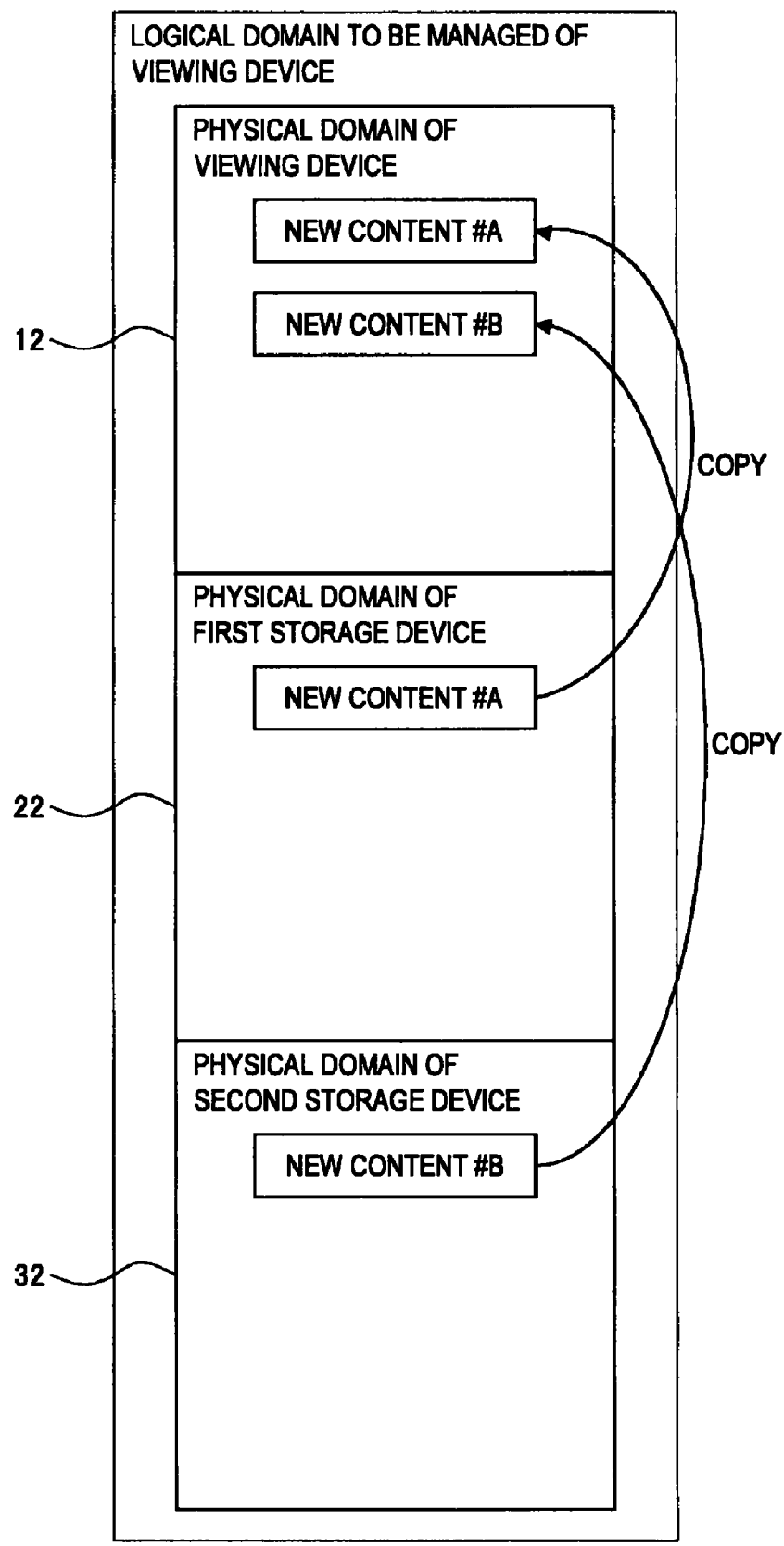
FIG. 7 is a schematic view conceptually showing a content management function in time of content retrieval according to the embodiment.

First, the content management of when the storage devices 20, 30 retrieve a new content will be described with reference to FIG. 7. FIG. 7 is a schematic view conceptually showing the content management function in time of content retrieval according to the present embodiment.

The storage devices 20, 30 acquire a new content from an external device of the home network system such as through external input, download, or removable medium 36, and save the content in the storage units 22, 32. The acquisition and the saving of the new content are referred to as "retrieval of content".

When a new content is retrieved from the outside, the storage devices 20, 30 notify a notification (hereinafter referred to as "retrieval notification") indicating that the content is retrieved (saved) in the storage devices 20, 30 to the viewing device 10 through the network 5 immediately after the retrieval. For instance, in the example of FIG. 7, a new content A is retrieved to the first storage device 20, and a new content B is retrieved to the second storage device 30. In this case, the control unit 23 of the first storage device 20 transmits a retrieval notification of the content A to the viewing device 10, and the control unit 33 of the second storage device 30 transmits the notification indicating the retrieval notification of the content B to the viewing device 10. Such retrieval information contains the identification information (e.g., file name) of the retrieved new content, the storage area information (e.g., device ID of the storage device 20, 30) of the content, and the retrieval time and date information (correspond to last access time and date information).

When receiving the retrieval notification from the storage devices 20, 30, the content management unit 15 of the viewing device 10 acquires the new contents A, B from the storage devices 20, 30 through the communication unit 13 with the retrieval notification as a trigger, and saves such new contents in the high-speed storage unit 12 of the viewing device 10. As a result, the new content A retrieved to the medium-speed storage unit 22 of the first storage device 20 is copied to the high-speed storage unit 12 of the viewing device 10, as shown in FIG. 7. The new content B retrieved to the low-speed storage unit 32 of the second storage device 30 is also copied to the high-speed storage unit 12 of the viewing device 10

Figure 8:
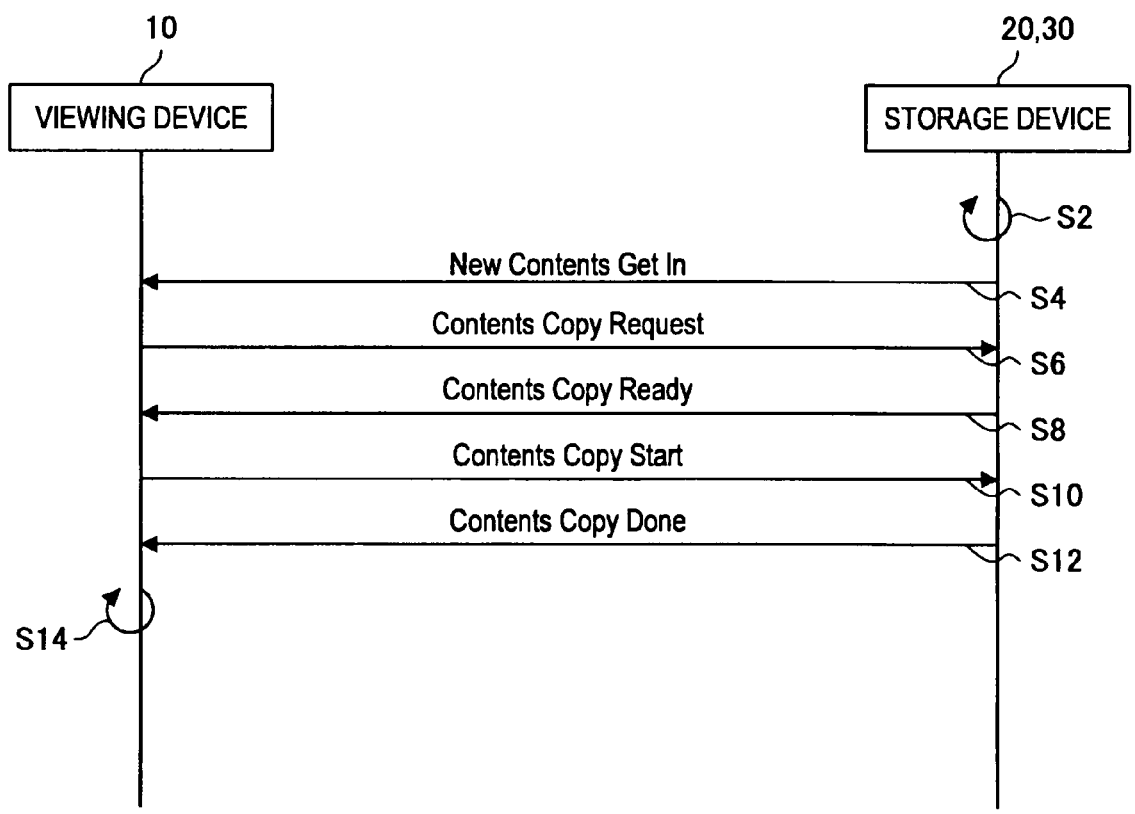
FIG. 8 is a sequence chart showing the operation of the viewing device and the storage devices in time of content retrieval according to the embodiment.

The operation of the viewing device 10 and the storage devices 20, 30 in time of content retrieval will be described with reference to FIG. 8. FIG. 8 is a sequence chart showing the operation of the viewing device 10 and the storage devices 20, 30 in time of content retrieval according to the present embodiment.

As shown in FIG. 8, when the storage device 20, 30 retrieves the new content A, B (S2), the storage device 20, 30 transmits the retrieval notification (New Contents Get In) of the content A, B to the viewing device 10 (S4). The retrieval notification contains information for managing the content such as the identification information and the storage area information on the content, and the retrieval date information. The viewing device 10 transmits a copy request (Contents Copy Request) of the content A, B to the storage device 20, 30, which is the notifying source, in response to the retrieval notification (S6). The physical domain of the copy destination of the content A, B is instructed in the copy request. The storage device 20, 30 then transmits a ready notification (Contents Copy Ready) indicating that the preparation for performing copy is ready to the viewing device 10 in response to the copy request (S8). S12 and S14 may be omitted depending on the protocol, and the content A, B may be sent from the storage device 20, 30 to the viewing device 10.

The viewing device 10 then transmits an instruction to start copy (Contents Copy Start) of the content A, B to the storage device 20, 30 in response to the preparation ready notification (S10). The content A, B is consequently copied from the storage unit 22, 32 of the storage device 20, 30 to the high-speed storage unit 12 of the viewing device 10. After the copy is done, the storage device 20, 30 transmits a copy done notification (Contents Copy Done) to the viewing device 10 (S12). The viewing device 10 thereafter generates management information on the content A, B based on the information contained in the retrieval notification, and saves the management information in the management information storage unit 14 (S14).

The content management when retrieving the new content A, B in the storage device 20, 30 has been described above. As described above, the viewing device 10 also copies the content A, B in the viewing device 10 when retrieving the new content A, B in the storage device 20, 30, with the retrieval notification from the storage device 20, 30 as the trigger. Such copy operation is automatically performed according to the retrieval of the content without involving any user operation. The viewing device 10 and the storage devices 20, 30 thus hold the new content A, B. As a result, when subsequently reproducing the content A, B, the content reproduction unit 16 of the viewing device 10 rapidly accesses the content A, B saved in the high-speed storage unit 12 of the viewing device 10 and starts to reproduce the same. Furthermore, the power consumption can be reduced since only the viewing device 10 is activated in time of reproduction. The risk of losing the contents A, B due to breakdown of the storage devices 20, 30 also can be reduced since the same contents A, B are saved in both the viewing device 10, and the storage devices 20, 30.

[4.2 Content Management When Reproducing Content]

Figure 9:
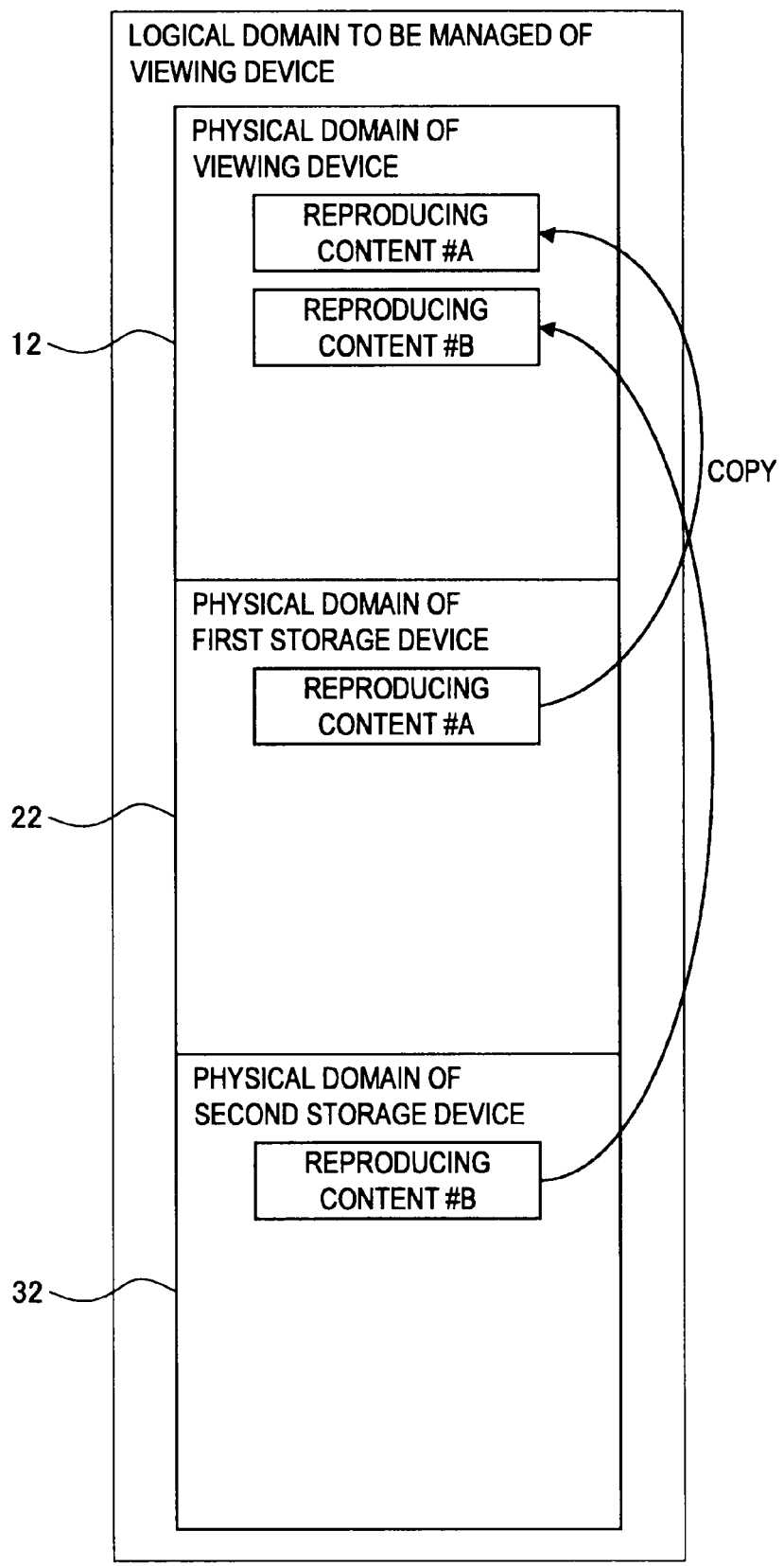
FIG. 9 is a schematic view conceptually showing the content management function in time of content reproduction according to the embodiment.

The content management of when the viewing device 10 reproduces the content saved in the storage devices 20, 30 will now be described with reference to FIG. 9. FIG. 9 is a schematic view conceptually showing the content management function in time of content reproduction according to the present embodiment. The reproducing content in FIG. 9 is the content to be reproduced.

In the home network system, the viewing device 10 is a device (e.g., TV receiver) mainly used by the user to view contents. The user can view the content using the viewing device 10 by operating the viewing device 10 to instruct reproduction of contents saved in at least one of the viewing device 10, or the storage devices 20, 30. When viewing the content in the storage device 20, 30 with the viewing device 10, the content is transferred from the storage device 20, 30 to the viewing device 10, the content is reproduced at the viewing device 10, and the video of the content is displayed on the display unit 11.

The viewing device 10 accepts the reproducing instruction (correspond to viewing request of content) on the content saved in the storage device 20, 30 from the user. For instance, the example of FIG. 9 shows that the reproduction of the content A saved in the medium-speed storage unit 22 of the first storage device 20 and the content B saved in the low-speed storage unit 32 of the second storage device 30 is instructed. When accepting the reproducing instruction from the user, the viewing device 10 references the management information of the management information storage unit 14 to determine whether or not the content, which reproducing instruction is accepted, is saved in the high-speed storage unit 12 of the viewing device 10. If the content is not saved, the viewing device 10 acquires the content, which reproducing instruction is accepted, from the storage device 20, 30.

In other words, the viewing device 10 acquires the content A, B (reproducing content), which reproducing instruction is accepted, from the storage device 20, 30 through the communication unit 13 with the reproducing instruction from the user as a trigger, and saves the content in the high-speed storage unit 12. As a result, the reproducing content A saved in the medium-speed storage unit 22 of the first storage device 20 is copied to the high-speed storage unit 12 of the viewing device 10, as shown in FIG. 9. The reproducing content B saved in the low-speed storage unit 32 of the second storage device 30 is also copied to the high-speed storage unit 12 of the viewing device 10. The reproducing contents A, B, which reproducing instructions are accepted, are thus automatically copied from the storage device 20, 30 to the viewing device 10. The copy process of the reproducing contents A, B may be performed at any of before execution of, during the execution of, or after the execution of the reproduction process of the reproducing content A, B.

Figure 10:
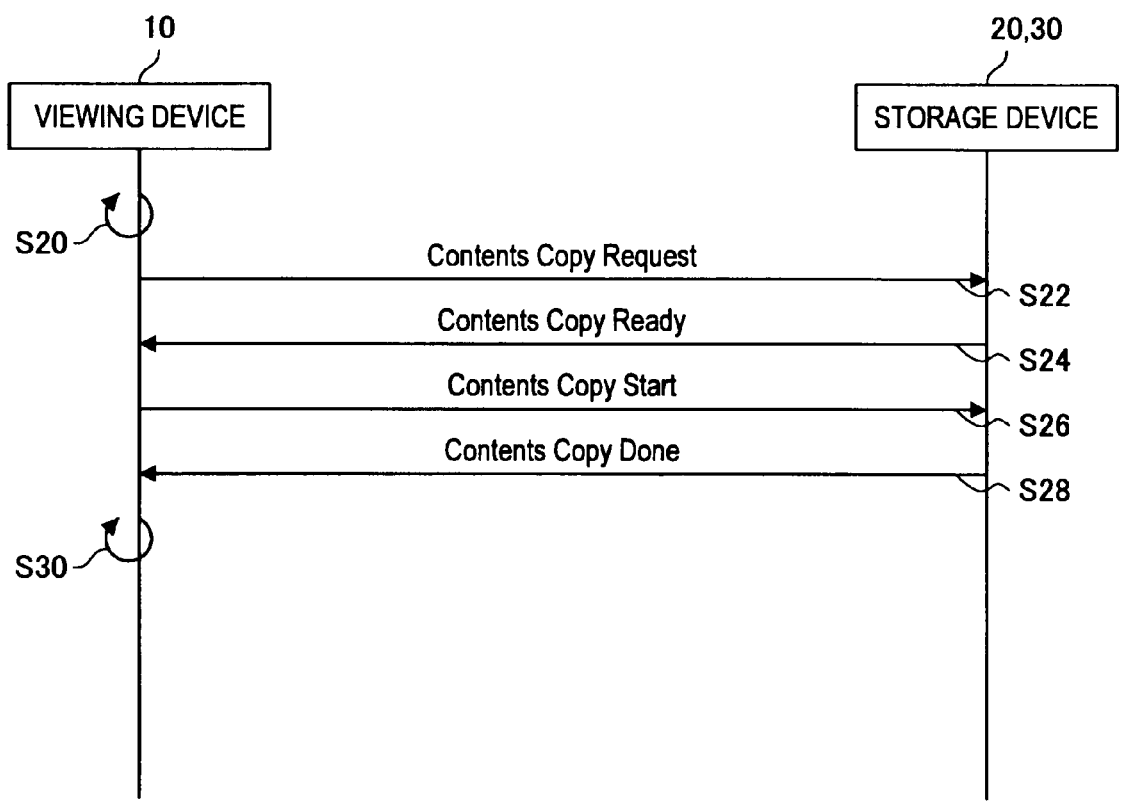
FIG. 10 is a sequence chart showing the operation of the viewing device and the storage devices in time of content reproduction according to the embodiment.

The operation of the viewing device 10 and the storage devices 20, 30 in time of content reproduction will be described with reference to FIG. 10. FIG. 10 is a sequence chart showing the operation of the viewing device 10 and the storage devices 20, 30 in time of content reproduction according to the present embodiment.

As shown in FIG. 10, the viewing device 10 first accepts the reproducing instruction of the reproducing content A or B saved in the storage device 20, 30 from the user (S20). The viewing device 10 then transmits a copy request (Contents Copy Request) of the reproducing content A, B to the storage device 20, 30, which is the notifying source, in response to the reproducing instruction (S22). The physical domain of the copy destination of the content A, B is instructed in the copy request. The storage device 20, 30 then transmits a ready notification (Contents Copy Ready) indicating that the preparation for performing copy is ready to the storage device 20, 30 in response to the copy request (S24). S22 and S24 may be omitted depending on the protocol, and the content A, B may be sent from the storage device 20, 30 to the viewing device 10.

The viewing device 10 then transmits an instruction to start copy (Contents Copy Start) of the reproducing content A, B to the storage device 20, 30 in response to the ready notification (S26). The reproducing content A, B is consequently copied from the storage unit 22, 32 of the storage device 20, 30 to the high-speed storage unit 12 of the viewing device 10. After the copy is done, the storage device 20, 30 transmits a copy done notification (Contents Copy Done) to the viewing device 10 (S28). The viewing device 10 thereafter updates management information on the content A, B in the management information storage unit 14 (S30). Specifically, the viewing device 10 updates the last access time and date information to the time and date at which the reproducing instruction is accepted, and updates the storage area information on the reproducing content A, B to the physical domain of the storage units of the storage device 20, 30 and the viewing device 10.

The content management when reproducing the new content A, B saved in the storage device 20, 30 with the viewing device 10 has been described above. As described above, the viewing device 10 also copies the content A, B in the viewing device 10 when reproducing the content A, B in the storage device 20, 30, with the reproducing instruction by the user as the trigger. Such copy operation is automatically performed according to the reproducing instruction of the content without having the user input a particular copy instruction. The viewing device 10 and the storage devices 20, 30 thus hold the reproducing contents A, B. As a result, when subsequently reproducing the content A, B, the content reproduction unit 16 of the viewing device 10 rapidly accesses the contents A, B saved in the high-speed storage unit 12 of the viewing device 10 and starts to reproduce the same. Furthermore, since the contents A, B immediately after the retrieval have a high possibility of being viewed by the user, there is a merit in saving the content in the viewing device 10. The power consumption can be reduced since only the viewing device 10 is activated in time of reproduction. The risk of losing the contents A, B due to breakdown of the storage devices 20, 30 also can be reduced since the same contents A, B are saved in both the viewing device 10, and the storage devices 20, 30.

[4.3 Content Management Based on Elapsed Time From Last Access Time and Date]

Figure 11:
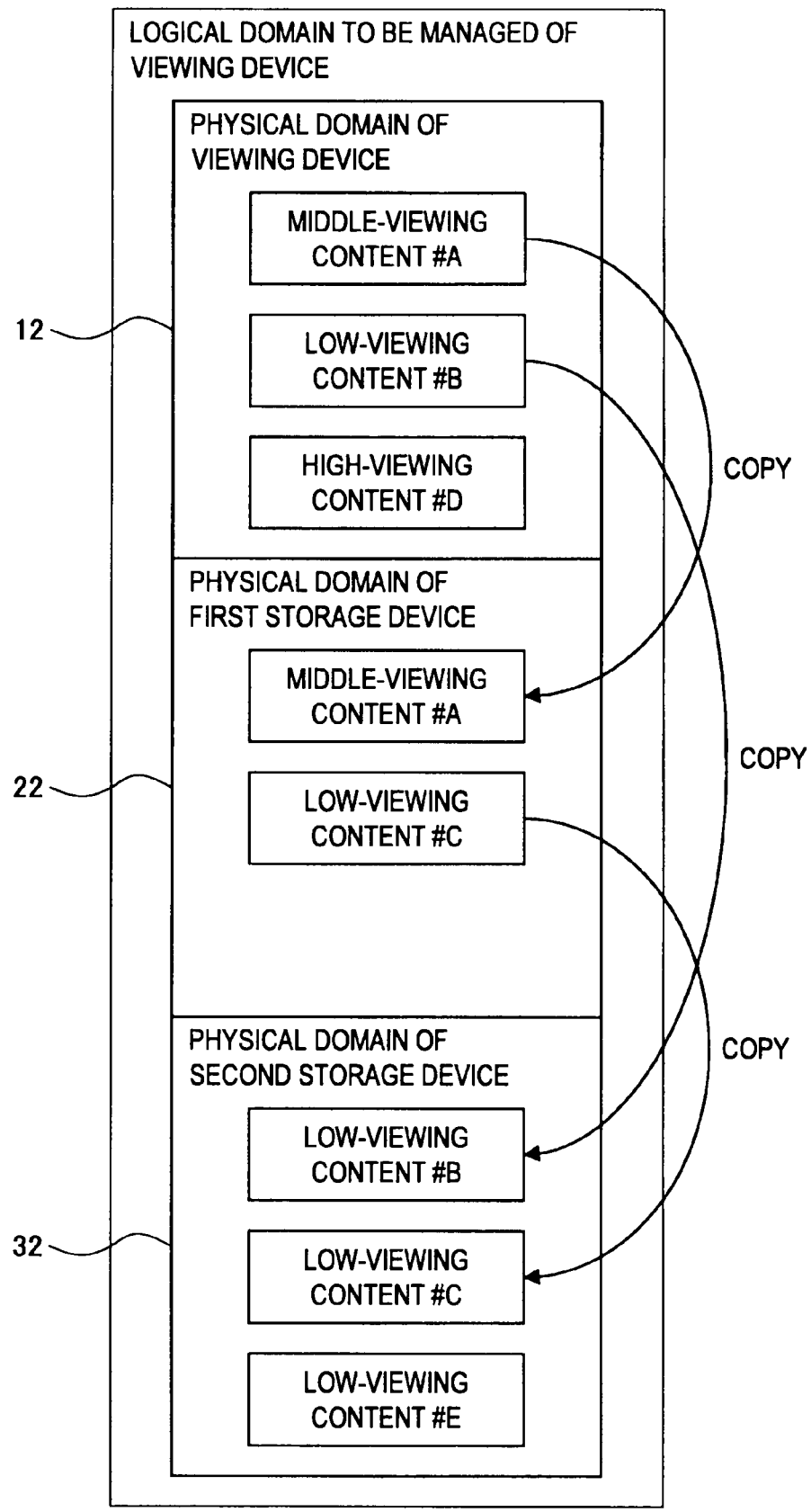
FIG. 11 is a schematic view conceptually describing the content management function based on the elapsed time from a last access time and date according to the embodiment.
Figure 12:
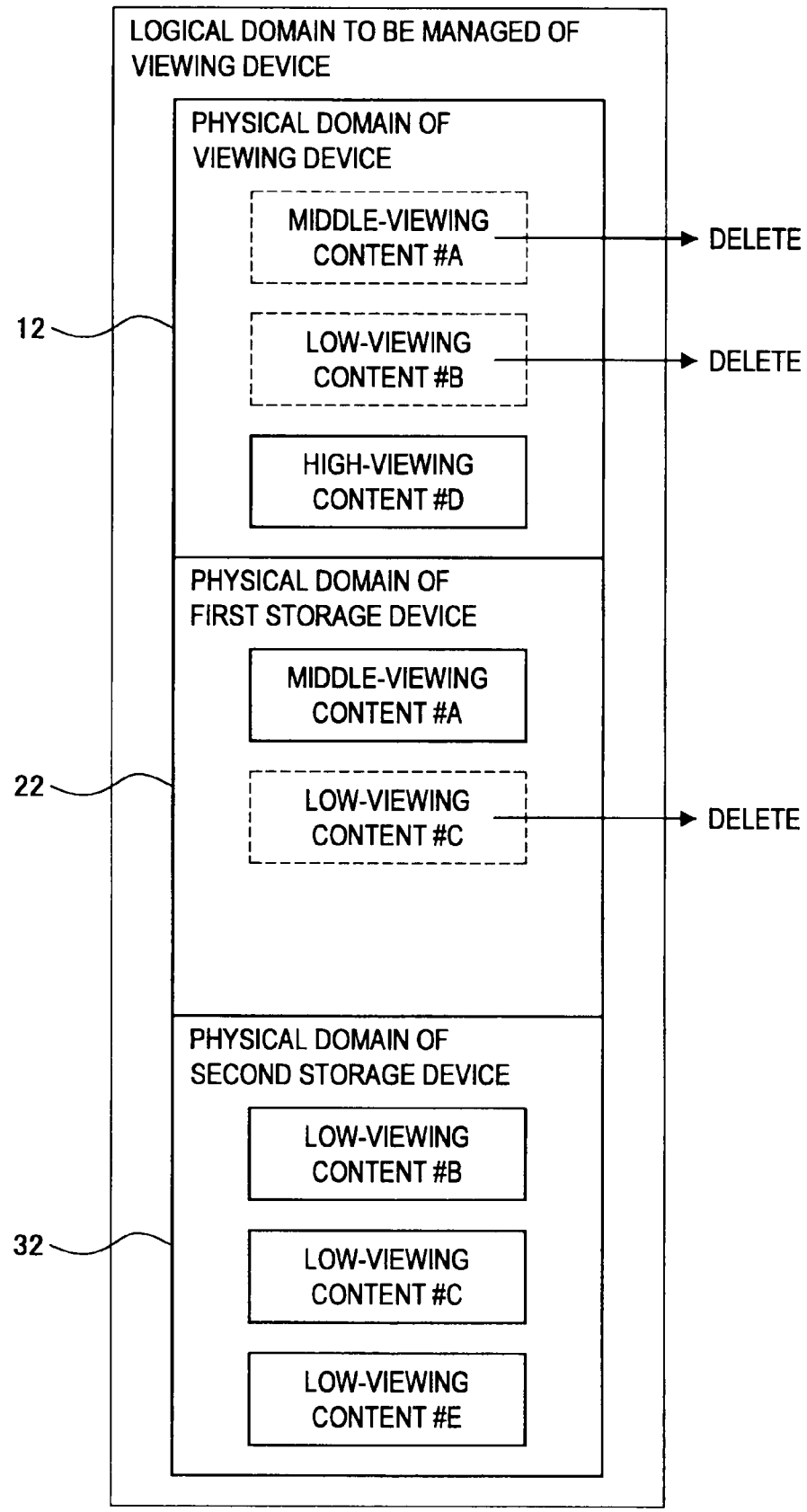
FIG. 12 is a schematic view conceptually describing the content management function based on the elapsed time from a last access time and date according to the embodiment.
Figure 13:
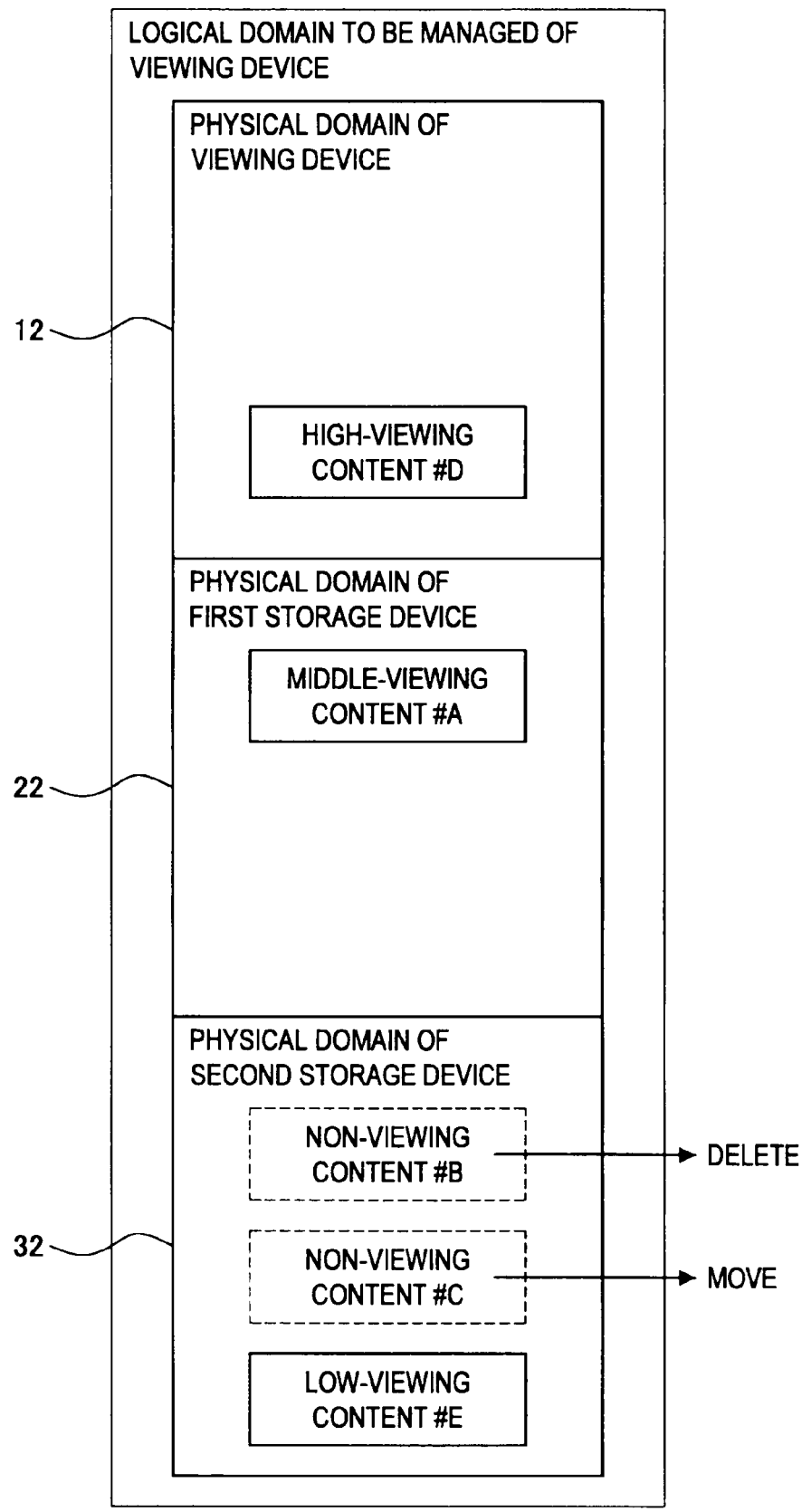
FIG. 13 is a schematic view conceptually describing the content management function based on the elapsed time from a last access time and date according to the embodiment.

The content management for managing the storage area of the content based on the elapsed time from the last access time and date with respect to the content will now be described with reference to FIGS. 11 to 13. FIGS. 11 to 13 are schematic views conceptually describing the content management function based on the elapsed time from the last access time and date according to the present embodiment.

A high viewing content in FIGS. 11 to 13 is a content which elapsed time from the last access time and date is smaller than a predetermined first threshold value (e.g., one week), and is equivalent to a content which viewing frequency of the user is high. A middle viewing content is a content which elapsed time from the last access time and date is greater than or equal to the predetermined first threshold value (e.g., one week) and smaller than a predetermined second threshold value (e.g., two weeks), and is equivalent to a content which viewing frequency of the user is moderate. A low viewing content is a content which elapsed time from the last access time and date is greater than or equal to the predetermined second threshold value (e.g., two weeks) and smaller than a predetermined third threshold value (e.g., one month), and is equivalent to a content which viewing frequency of the user is low. A non-viewing content is a content which elapsed time from the last access time and date is greater than or equal to the predetermined third threshold value (e.g., one month), and is equivalent to a content which viewing frequency of the user is very low or which is not viewed at all.

The management information stored in the management information storage unit 14 of the viewing device 10 contains the last access time and date for all contents saved in the viewing device 10, and the storage devices 20, 30. The last access time and date information represent the time and date at which the viewing device 10 last accessed (e.g., access for reproduction or retrieval, etc.) the content in the system. Thus, the content management unit 15 of the viewing device 10 can calculate the elapsed time from the last access time and date with respect to each content in the system by calculating the difference between the last access time and date information stored in the management information storage unit 14 and the current time and date at an arbitrary time point. The current time and date can be acquired by the timing function provided to the viewing device 10.

The elapsed time from the last access time and date corresponds to the access frequency (reproduction frequency) on the content by the viewing device 10, that is, the viewing frequency of the content by the user. That is, the longer the elapsed time from the last access time and date, this means that the user is not viewing the content and that the value of the content is low to the user. On the contrary, the shorter the elapsed time from the last access time and date, this means that the user is viewing the content often and that the value of the content is high to the user.

The viewing device 10 according to the present embodiment ranks all contents in the system according to the elapsed time from the last access time and date (equivalent to access frequency and viewing frequency on the content), and manages the storage area of the content according to the rank. The rank of the elapsed time is set by segmenting the elapsed time from the last access time and date using a plurality of threshold values (e.g., first, second, third threshold values). For instance, segmentation is such that the rank is a high viewing rank if the elapsed time is smaller than the first threshold value (less than one week), middle viewing rank if the elapsed time is greater than or equal to the first threshold value and smaller than the second threshold value (one week to two weeks), low viewing rank if the elapsed time is greater than or equal to the second threshold value and smaller than the third threshold value (two weeks to one month), and non-viewing rank if greater than or equal to the third threshold value (longer than or equal to one month). The content management unit 15 saves the content with higher access frequency (viewing frequency) rank indicated by the elapsed time in a storage unit of small capacity, to which high-speed access can be made, that is, to the high-speed storage unit 12 of the viewing device 10. The content with lower access frequency (viewing frequency) rank is saved in a storage unit of low access speed but large capacity, that is, the low-speed storage unit 32 of the second storage device 30. The content thus can be efficiently arranged according to the viewing frequency of the user in the limited storage of the system by managing the storage area of the content according to the access frequency.

The management of the storage area of the content corresponding to the access frequency based on the elapsed time from the last access time and date will be specifically described below. As shown in FIG. 11, assume that the middle viewing content A, the low viewing content B, and the high viewing content D are saved in the high-speed storage unit 12 of the viewing device 10, the low viewing content C is saved in the medium-speed storage unit 22 of the first storage device 20, and the low viewing content E is saved in the low-speed storage unit 32 of the second storage device 30.

In this case, the content management unit 15 of the viewing device 10 moves the contents A to C so that, ultimately, the high viewing content D is saved in the high-speed storage unit 12 of the viewing device 10, the middle viewing content A is saved in the medium-speed storage unit 22 of the first storage device 20, and the low viewing contents B, C, E are saved in the low-speed storage unit 32 of the second storage device 30, as shown in FIG. 13. The moving of the contents can be implemented by the combination of the copy of the content shown in FIG. 11 and the deletion of the content shown in FIG. 12.

Specifically, as shown in FIG. 11, the content management unit 15 first copies the middle viewing content A saved in the high-speed storage unit 12 to the medium-speed storage unit 22, and copies the low viewing content B saved in the high-speed storage unit 12 to the low-seed storage unit 32. The content management unit 15 also copies the low viewing content C saved in the medium-speed storage unit 22 to the low-speed storage unit 32. Then, as shown in FIG. 12, the content management unit 15 deletes the middle viewing content A and the low viewing content B saved in the high-speed storage unit 12, and the low viewing content C saved in the medium-speed storage unit 22. As a result, the middle viewing content A saved in the high-speed storage unit 12 is moved to the medium-speed storage unit 22. Furthermore, the low viewing content B saved in the high-speed storage unit 12 and the low viewing content C saved in the medium-speed storage unit 22 are moved to the low-speed storage unit 32.

Each content A to E is thus saved in the storage area corresponding to the elapsed time by moving the contents A to C among the storage units 12, 22, 32 according to the elapsed time from the last access time and date with respect to the contents A to E. Therefore, the high viewing content of high access frequency is saved in the viewing device 10, the middle viewing content of moderate access frequency is saved in the first storage device 20, and the low viewing content of low access frequency is saved in the second storage device 30. The content is moved to the storage area of slower access speed as the elapsed time from the last access time and date increases. Consequently, the content can be saved in an appropriate device, taking into consideration the access speed in time of reproduction, according to the rank of the access frequency (viewing frequency) to which the content belongs.

Furthermore, consider a case in which the elapsed from the last access time and date of the contents B, C saved in the low-speed storage unit 32 becomes greater than or equal to a predetermined third threshold value (e.g., one month), as shown in FIG. 13, when the time advances from the state of FIG. 12. In this case, the rank of the access frequency for the contents B, C lowers from the low viewing content to the non-viewing content, and the contents B, C become the erase candidate contents. The content management unit 15 then notifies the user that the non-viewing contents B, C exist. The content management unit 15 either deletes the non-viewing contents B, C from the low-speed storage unit 32 or moves the same to the removable medium 36 based on user selection. The user selects to delete if the non-viewing content B is unnecessary, and selects to move if desiring to leave the non-viewing content. The content management unit also deletes or moves the non-viewing contents B, C from the low-speed storage unit 32, and also deletes the copies of the non-viewing contents B, C if remaining in other storage units 12, 22 of the present system.

A free space of the storage units 12, 22, 32 can be ensured by deleting or moving the non-viewing contents B, C in the above manner to exclude the non-viewing contents B, C of very low viewing frequency from the storage units 12, 22, 32 in the system. The content of higher access frequency thus can be saved.

Similarly, if the free space of the low-speed storage unit 32 of the second storage device 30 becomes smaller than or equal to a predetermined value, the contents B, C may be deleted or moved even if the elapsed time from the last access time and date of the contents B, C is smaller than the predetermined third threshold value. With this, the free space of the low-speed storage unit 32 of the second storage device 30 can be prevented from becoming zero, and more important content can be saved in the low-speed storage unit 32.

In the example of FIGS. 11 and 12, the contents A to C are consequently moved by performing copy and deletion of the contents A to C, but this is not the sole case. As a variant, an example of not moving will be described. When moving the contents A to C, the content management unit 15 may copy, instead of moving the contents A to C, according to whether or not the same contents A to C are saved in other storage units different from the storage unit of the moving destination.

Specifically, after the copy of FIG. 11 and before the deletion of FIG. 12, the content management unit 15 checks whether or not the content A to be moved is also saved in the low-speed storage unit 32 other than the medium-speed storage unit 22 of the moving destination. If the content A is not saved in the low-speed storage unit 32 as in the example of FIG. 12, the content management unit 15 may only copy the content A from the high-speed storage unit 12 to the medium-speed storage unit 22 and not delete the content A in the high-speed storage unit 12 (switch from move to copy). Alternatively, the content management unit 15 may copy the content A from the high-speed storage unit 12 to both the medium-speed storage unit 22 and the low-speed storage unit 32 (double copy). In either case, the same content A is saved in at least two storage units of the high-speed storage unit 12, the medium-speed storage unit 22, and the low-speed storage unit 32. Therefore, even if one storage unit breaks down, the content A remains in the other storage unit, and hence the risk of losing the content A can be avoided.

Figure 14:
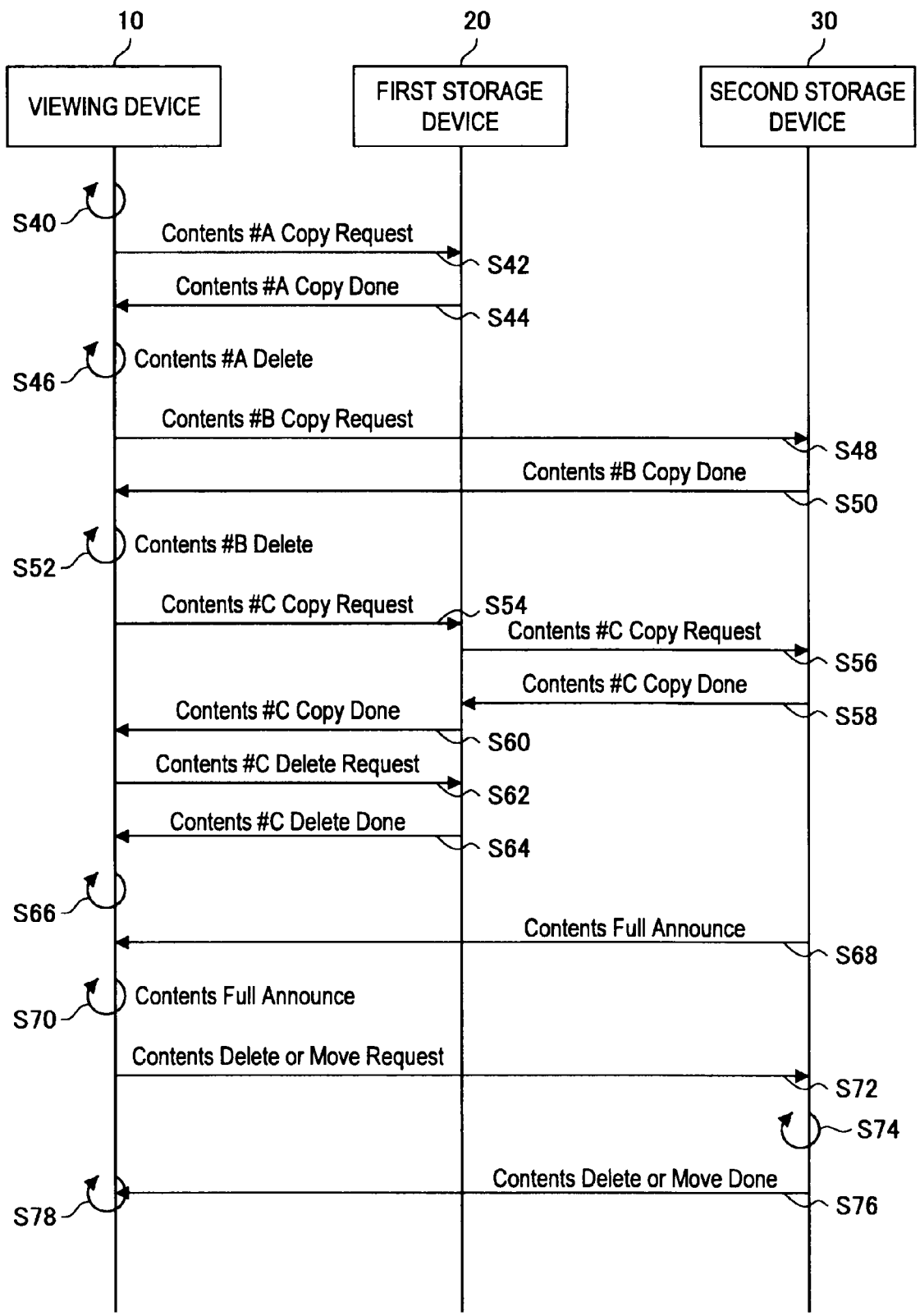
FIG. 14 is a sequence chart showing the operation of the viewing device and the storage devices in time of content management based on the elapsed time from the last access time and date according to the embodiment.

The operation of the viewing device 10 and the storage devices 20, 30 when performing the content management based on the elapsed time from the last access time and date will be described with reference to FIG. 14. FIG. 14 is a sequence chart showing the operation of the viewing device 10 and the storage devices 20, 30 in time of content management based on the elapsed time from the last access time and date according to the present embodiment.

As shown in FIG. 14, the content management unit 15 of the viewing device 10 first determines the rank representing the access frequency of each content based on the elapsed time from the last access time and date according to a predetermined trigger (S40). Specifically, the content management unit 15 first calculates the elapsed time from the last access time and date with respect to all contents in the home network system based on the management information in the management information storage unit 14. The content management unit 15 then determines the rank of each content based on the elapsed time. This rank corresponds to the access frequency (viewing frequency) on the content, and includes high viewing, middle viewing, low viewing, and non-viewing ranks, as shown in FIGS. 11 to 13. In the following processes, the viewing device 10 manages the storage area of each content according to the determined rank.

The viewing device 10 then moves the middle viewing content A ranked in S40 from the high-speed storage unit 12 of the viewing device 10 to the medium-speed storage unit 22 of the first storage device 20 (S42 to S46). Specifically, the viewing device 10 transmits a copy request (Contents Copy Request) of the middle viewing content A ranked in S40 to the first storage device 20 (S42). As a result, the middle viewing content A is copied from the high-speed storage unit 12 of the viewing device 10 to the medium-speed storage unit 22 of the first storage device 20. After the copy is done, the first storage device 20 transmits a copy done notification (Contents Copy Done) to the viewing device 10 (S44). Thereafter, the viewing device 10 deletes the middle viewing content A saved in the high-speed storage unit 12 of the viewing device 10 (S46).

The viewing device 10 then moves the low viewing content B ranked in S40 from the high-speed storage unit 12 of the viewing device 10 to the low-speed storage unit 32 of the second storage device 30 (S48 to S52). The process of moving the low viewing content B is similar to S42 to S44, and thus the detailed description thereof will be omitted.

Subsequently, the viewing device 10 moves the low viewing content C ranked in S40 from the medium-speed storage unit 22 of the first storage device 20 to the low-speed storage unit 32 of the second storage device 30 (S54 to S64).

Specifically, the viewing device 10 transmits a copy request (Contents Copy Request) of the middle viewing content C ranked in S40 to the first storage device 20 (S54). Such copy request instructs that the copy is to be carried out from the first storage device 20 to the second storage device 30. The first storage device 20 then transmits a copy request (Contents Copy Request) of the low viewing content C to the second storage device 30 (S56). As a result, the low viewing content C is copied from the medium-speed storage unit 22 of the first storage device 20 to the low-speed storage unit 32 of the second storage device 30. After the copy is done, the second storage device 30 transmits a copy done notification (Contents Copy Done) to the viewing device 10 through the first storage device 20 (S58, S60).

Thereafter, the viewing device 10 transmits a delete request (Contents Delete Request) of the low viewing content C saved in the first storage device 20 to the first storage device 20 (S62). The first storage device 20 then deletes the low viewing content C saved in the medium-speed storage unit 22 of the first storage device 20 (S64).

After the contents A to C are moved through S42 to S64 described above, the viewing device 10 updates the management information on the contents A to C in the management information storage unit 14 according to the move of the contents (S66).

Thereafter, when the data storage amount of the low-speed storage unit 32 of the second storage device 30 becomes substantially full (e.g., free space is smaller than or equal to a predetermined amount), the second storage device 30 transmits a notification indicating the same (Contents Full Announce) to the viewing device 10 (S68). The content management unit 15 of the viewing device 10 then notifies the user by displaying on the display unit 11 and the like that the data storage amount of the low-speed storage unit 32 is substantially full (S70). In this case, the content management unit 15 displays, on the display unit 11, a selection screen of the content to be deleted or moved from the low-speed storage unit 32 with the notification. The user performs an operation input to select the content to be deleted or moved and whether to delete or move while looking at the selection screen.

As a result, the content management unit 15 of the viewing device 10 selects the contents B, C according to the user input, and transmits a request (Contents Delete or Move Request) for deleting or moving the contents B, C from the low-speed storage unit 32 of the second storage device 30 to the second storage device 30 (S72). The second storage device 30 then deletes or moves to the removable medium 36 the contents B, C saved in the low-speed storage unit 32 of the second storage device 30 (S74). The second storage device 30 further transmits a delete or move done notification (Contents Delete or Move Done) to the viewing device 10 (S76). When receiving the delete or move done notification, the viewing device 10 updates the management information on the contents B, C in the management information storage unit 14 according to the delete or the move of the contents (S78).

The content management based on the elapsed time from the last access time and date with respect to the content has been described above. As described above, in the present embodiment, the contents A to E are moved, copied, or deleted among the three storage units 12, 22, 32 and the removable medium 36 according to the elapsed time, and each content A to E is saved in the storage area corresponding to the elapsed time. Thus, the content can be saved in an appropriate storage area that takes into consideration the access speed in time of reproduction according to the access frequency (viewing frequency) corresponding to the elapsed time. The content the user of the viewing device 10 desires to view is generally saved in the high-speed storage unit 12 of the viewing device 10. The high-speed storage unit 12 starts up at high speed, and thus the access speed with respect to the content the user desires to view also enhances compared to the related art. The content the user barely views is sequentially accumulated in the large capacity low-speed storage unit 32 of the second storage device 30. The storage capacity of the content in the entire system thus can be ensured. Furthermore, when the free space of the low-speed storage unit 32 becomes small, contents in the low-speed storage unit 32 can be appropriately deleted or moved to the removable medium 36. The free space of the low-speed storage unit 32 thus can be ensured, whereby important contents having higher viewing frequency can be prevented from not being able to be saved in the low-speed storage unit 32.

The management of the storage area of the content based on the elapsed time is automatically performed periodically or in response to a predetermined trigger by the viewing device 10 without the user inputting a particular instruction. The user thus does not need to pay particular attention to the management of the content.

The content may be copied to one of the storage devices 20, 30 and may not be deleted from the viewing device 10 instead of being moved (copy+delete) as shown in FIGS. 11 and 12. Alternatively, the content may be double copied to the two storage devices 20, 30, and deleted from the viewing device 10. The same content thus can be saved in at least two devices of the viewing device 10 and the storage devices 20, 30, whereby the risk of losing the content due to breakdown of the viewing device 10 and the storage devices 20, 30 can be reduced.

[5. Content Management Flow]

The content management flow by the viewing device 10 according to the present embodiment will now be described with reference to FIG. 15. FIG. 15 is a flowchart showing the content management flow by the viewing device 10 according to the present embodiment.

As shown in FIG. 15, the viewing device 10 determines whether or not a new content is retrieved to at least one of the storage devices 20, 30 based on the presence of the retrieval notification from the storage devices 20, 30 (S80). The process proceeds to S86 if a new content is not retrieved as a result.

If a new content is retrieved to at least one of the storage devices 20, 30, the viewing device 10 receives the new content saved in the storage unit 22, 32 through the network 5 from the storage device 20, 30, and saves the same in the high-speed storage unit 12 of the viewing device 10 (S82). The new content is thereby copied from the storage unit 22, 32 of the storage device 20, 30 to the high-speed storage unit 12 of the viewing device 10. The viewing device 10 then generates management information on the new content according to the copy of the new content, and writes the same to the management information storage unit 14 (S84). The management information on the new content is created based on the identification information, the storage area information, and the retrieval time and date information on the content contained in the retrieval notification transmitted from the storage device 20, 30.

The viewing device 10 then determines whether or not a reproducing instruction (viewing request) of the desired content in the home network system is made from the user (S86). If the reproducing instruction is not made as a result or if the reproducing instruction of the content saved in the viewing device 10 is made, the process proceeds to S92.

If the reproducing instruction of the content saved in at least one of the storage devices 20, 30 is made, the viewing device 10 receives the reproducing content saved in the storage unit 22, 32 of the storage device 20, 30 through the network 5 from the storage device 20, 30, and saves the same in the high-speed storage unit 12 of the viewing device 10 (S82). The reproducing content is then copied from the storage unit 22, 32 of the storage device 20, 30 to the high-speed storage unit 12 of the viewing device 10. The viewing device 10 then updates the management information on the reproducing content according to the copy of the reproducing content, and writes the same to the management information storage unit 14 (S84). For instance, the physical domain representing both the high-speed storage unit 12 of the viewing device 10 and the storage unit 22, 32 of the storage device 20, 30 is written as the storage area information on the management information.

The viewing device 10 then determines whether or not a predetermined trigger for performing the content management based on the elapsed time from the last access time and date occurred (S92). If the predetermined trigger is elapse of a predetermined time, the content management of S94 is performed on a regular basis. If the predetermined trigger is user instruction, the content management of S94 is appropriately performed according to the user instruction. The process proceeds to S94 if a predetermined trigger occurred as a result.

The viewing device 10 then executes the management of the storage area of the contents saved in the system based on the elapsed time from the last access time and date (S94). The viewing device 10 then updates the management information on the content, which storage area is changed, according to the management result of the storage area of the content in S94, and writes the same to the management information storage unit 14 (S96).

The content management process in S94 of FIG. 15 will be specifically described with reference to FIG. 16. FIG. 16 is a flowchart showing the content management process of S94 of FIG. 15.

As shown in FIG. 16, the viewing device 10 first determines the rank of each content according to the elapsed time from the last access time and date for all contents in the home network system (S102, S108, S114). All contents in the home network system are contents saved in at least one of the viewing device 10, the first storage device 20, or the second storage device 30. Here, first threshold value (e.g., one week) <second threshold value (e.g., one week)<second threshold value (e.g., two weeks)<third threshold value (e.g., one month). The viewing device 10 obtains the elapsed time from the last access time and date based on the last access time and date information in the management information storage unit 14 for all contents in the home network system. The viewing device 10 then compares the obtained elapsed time and the first to the third threshold values, and determines the rank of each content.

If the elapsed time from the last access time and date is smaller than the first threshold value (e.g., less than one week)

as a result, the viewing device 10 determines that the content is a high viewing content having high access frequency (NO in S102), and proceeds to S104. In this case, the viewing device 10 saves the high viewing content in the high-speed storage unit 12 of the viewing device 10 (S104). The high viewing content of high viewing frequency thus can be saved in the high-speed storage unit 12 of the viewing device 10 that can be high-speed accessed. Furthermore, the viewing device 10 saves a copy of the high viewing content in the medium-speed storage unit 22 of the first storage device 20 or the low-speed storage unit 32 of the second storage device 30 (S106). The same high viewing content thus can be saved in both the viewing device 10 and the storage device 20 or 30, and the risk of losing with the breakdown of the device can be reduced.

If the elapsed time from the last access time and date is greater than or equal to the first threshold value and smaller than the second threshold value (e.g., longer than or equal to one week and less than two weeks), the viewing device 10 determines that the content is a middle viewing content having moderate access frequency (NO in S108), and proceeds to S110. In this case, the viewing device 10 saves the middle viewing content in the medium-speed storage unit 22 of the first storage device 20 (S110). The middle viewing content of moderate viewing frequency thus can be saved in the medium-speed storage unit 22 of the first storage device 20 where the access speed can be ensured to a certain extent, and a free space of the high-speed storage unit 12 of the viewing device 10 can be ensured. The viewing device 10 also saves a copy of the middle viewing content in the low-speed storage unit 32 of the second storage device 30 (S112). The same middle viewing content thus can be saved in both the first storage device 20 and the second storage device 30, and the risk of losing with the breakdown of the device can be reduced.

If the elapsed time from the last access time and date is greater than or equal to the second threshold value and smaller than the third threshold value (e.g., longer than or equal to two weeks and less than one month), the viewing device 10 determines that the content is a low viewing content having low access frequency (NO in S114), and proceeds to S116. In this case, the viewing device 10 saves the low viewing content in the low-speed storage unit 32 of the second storage device 30 (S116). The low viewing content of low viewing frequency thus can be saved in the low-speed storage unit 32 of the large capacity second storage device 30, and a free space of the high-speed storage unit 12 of the viewing device 10 and the medium-speed storage unit 22 of the first storage device 20 can be ensured. The viewing device 10 also determines whether or not the free space of the low-speed storage unit 32 of the second storage device 30 is smaller than or equal to a predetermined value based on the notification of the free space from the second storage device 30 (S118). If the free space is smaller than or equal to the predetermined value, the viewing device 10 notifies the user to move the low viewing content to the removable medium 36 attached to the second storage device 30 (S120). The user then performs an input operation on the viewing device 10 to select whether to move the low viewing content to the removable media 36, delete the same, or save as is in the low-speed storage unit 32 in response to the notification. The viewing device 10 then moves the low viewing content to the removable medium 36 or deletes the low viewing content from the low-speed storage unit 32 according to the use selection (S122). If moved, the same low viewing content can be saved in both the second storage device 30 and the removable medium 36, and the risk of losing with the breakdown of the device can be reduced. If deleted, the free space of the low-speed storage unit 32 can be ensured.

If the elapsed time from the last access time and date is greater than or equal to the second threshold value and greater than or equal to the third threshold value (e.g., longer than or equal to one month), the viewing device 10 determines that the content is a non-viewing content having a very low access frequency (YES in S114), and proceeds to S124. The viewing device 10 notifies the user to move the non-viewing content to the removable medium 36 attached to the second storage device 30 (S124). The user then performs an input operation on the viewing device 10 to select whether to move the non-viewing content to the removable media 36, or to delete the same in response to the notification. The viewing device 10 then moves the non-viewing content to the removable medium 36 or deletes the non-viewing content from the low-speed storage unit 32 of the original saving source according to the use selection (S126). If moved, the non-viewing content can be saved in the removable medium 36 and prevented from being lost. If deleted, the free space of the low-speed storage unit 32 can be ensured.

[6. Effect]

The home network system, the viewing device 10, and the storage devices 20, 30 and the content management method in the system according to the present embodiment have been described above. The present embodiment has the following effects.

(1) Enhancement of Access Speed with Respect to Content

The content the user of the viewing device 10 desires to view includes a new content retrieved into the system, an actually reproduced reproducing content, a content which elapsed time from the last access time and date is short, and the like. According to the above-described content management method, such contents are generally automatically saved in the high-speed storage unit 12 of the viewing device 10 without a special operation of the user. Furthermore, the high-speed storage unit 12 of the viewing device 10 can be started up at high speed, and the content in the high-speed storage unit 12 can be rapidly accessed. Therefore, according to the present embodiment, the access speed with respect to the content the user desires to view greatly enhances compared to the system of the related art (see FIG. 1).

A system for push distributing the content among the devices exists in the related art, but the database of the management information on the contents is not managed at the distributing destination even in such push distribution. In the present embodiment, the new content is automatically copied from the storage device 20, 30 to the viewing device 10 at the time point such a new content is retrieved to the storage device 20, 30 without involving any user operation and regardless of whether the user desires to view the content. Further, the viewing device 10 unify manages the management information on all contents in the system in real time. Thus, in the present embodiment, the storage area of the content in the system is managed, as needed, in real time according to the level of importance of the user, so that the access speed in time of reproduction can be enhanced for important contents the user desires to view.

(2) Reduction in Risk of Losing Content

The content existing in the present system is saved in a distributed manner with redundancy in each storage unit 12, 22, 32 according to the level of importance (viewing frequency) of the user with a parameter including an elapsed time from the last access time and date on each content as a reference. Therefore, the content of high importance to the user is saved in a plurality of devices, and is less likely to disappear due to breakdown etc. of the devices 10, 20, 30. Thus, the risk of losing the content in the present system, particularly the content of high importance, can be reduced.

(3) Optimization of Storage Cost

In the present system, the content of low importance and large amount tends to be saved in the inexpensive large capacity storage unit (e.g., removable medium 36 and low-speed storage unit 32). In the entire system, the free space of the storage unit terminates at the low-speed storage unit 32 of the second storage device 30. Thus, the plurality of storage units 12, 22, 32 in the present system can be used without waste, and the free region can be efficiently used in the system as a whole, whereby optimum use of the storage resources can be achieved.

(4) Unify Management of Content

According to the present embodiment, the viewing device 10 is the control master, and can unify manage all contents saved in the viewing device 10 and the storage devices 20, 30 using the management information. The user of the viewing device 10 then can manage all contents in the system with only one unified interface.

(5) Reduction of Power Consumption of Entire System

When the user views the content using the viewing device 10, the possibility the content to be viewed exists in the high-speed storage unit 12 of the viewing device 10 is high. Thus, the other storage devices 20, 30 may not be started up or operated when viewing the content in the viewing device 10, whereby the power consumption of the entire system is merely the power consumption of only the viewing device 10. Thus, the power consumption of the entire system is reduced and the energy efficiency can be enhanced compared to the system of the related art (FIG. 1). The time for transmitting and receiving contents is also a short time compared to the viewing time of the content even when reproducing the content by cooperatively operating the viewing device 10 and the storage devices 20, 30. The power consumption of the entire system is thus reduced compared to the system of the related art (FIG. 1).

It should be understood by those skilled in the art that various modifications, combinations, sub-combinations and alterations may occur depending on design requirements and other factors insofar as they are within the scope of the appended claims or the equivalents thereof.

In the above-described embodiment, the viewing device 10 such as a digital TV receiver is given as an example of the information processing apparatus, and the first storage device 20 including a home server etc. and the second storage device 30 including the optical disc recorder etc. are given as examples of the external storage devices. However, the information processing apparatus and the external storage devices according to the embodiment of the present invention are not limited to such examples, and can be applied to an arbitrary electronic device having a storage function and a network communication function. For instance, the information processing apparatus and the external storage device may be a recording and reproducing device such as a video camera or a DVD/HDD player/recorder, a digital camera, a printer, a copy machine, a home game machine, other information home electronics, portable terminals such as a portable game machine, a portable video/audio player, or a PDA (Personal Digital Assistant), a personal computer (PC), and the like.

The information processing apparatus and the external storage devices may be an electronic device of the same type, for example, all of the information processing apparatus and the external storage devices may be configured by a digital television receiver, a PC, or the like. The information processing apparatus simply has to include an output device (display device or audio output device) suited for viewing contents as with the viewing device 10.

In the embodiment described above, an example of a home network system including one information processing apparatus (viewing device 10) and two external storage devices (storage devices 20, 30) has been described, but the installing number of external storage devices may be one or three or more. For instance, the management of the storage area of the content complying with the above-described embodiment can be carried out even with a network system including one information processing apparatus and one external storage device. Furthermore, similar to the above-described embodiment, the content management according to the viewing frequency (level of importance to user) of the content, with the elapsed time from the last access time and date as a reference, can be carried out even with a network system including one information processing apparatus and three or more external storage devices.

The present application contains subject matter related to that disclosed in Japanese Priority Patent Application JP 2009-000402 filed in the Japan Patent Office on Jan. 5, 2009, the entire content of which is hereby incorporated by reference.

What is claimed is:

1. An information processing apparatus, comprising:
a storage unit for saving content data;
a communication unit for communicating with one or more external storage devices; and
a content management unit for, when receiving from the external storage device through the communication unit a notification indicating that new content data is saved in the external storage device, acquiring the new content data from the external storage device through the communication unit with the notification as a trigger, and saving the new content data in the storage unit;
a management information storage unit for storing management information including storage area information of content data saved in at least one of the storage unit or the external storage device; wherein the content management unit manages a storage area of the content data in the storage unit and the external storage device based on the management information stored in the management information storage unit;
wherein the external storage device includes:
a first external storage device, for which access speed is slower than the storage unit; and
a second external storage device, for which access speed is slower than the first external storage device, and
the content management unit determines, when moving the content data saved in the storage unit to one of the first external storage device or the second external storage device, whether or not the content data is saved in the other one of the first or the second external storage device based on the storage area information of the management information, and deletes the content data from the storage unit after copying the content data from the storage unit to the other one of the first or the second external storage device if the content data is not saved.

2. The information processing apparatus according to claim 1, wherein
the management information further includes last access time and date information representing a last access time and date with respect to the content data by the information processing apparatus, and
the content management unit obtains an elapsed time from the last access time and date with respect the content data based on the last access time and date information, and manages the storage area of the content data according to the elapsed time.

3. The information processing apparatus according to claim 2, wherein
the external storage device includes a first external storage device, which access speed is slower than the storage unit, and
the content management unit copies or moves the content data from the storage unit to the first external storage device when the elapsed time from the last access time and date with respect to the content data saved in the storage unit is greater than or equal to a predetermined first threshold value.

4. The information processing apparatus according to claim 3, wherein
the external storage device includes the first external storage device and a second external storage device, which access speed is slower than the first external storage device; and
the content management unit copies or moves the content data from the storage unit or the first external storage device to the second external storage device when the elapsed time from the last access time and date with respect to the content data saved in the storage unit or the first external storage device is greater than or equal to a predetermined second threshold value greater than the first threshold value.

5. The information processing apparatus according to claim 4, wherein
the second external storage device includes a drive for recording data to a removable medium attached to the second external storage device, and
the content management unit moves the content data from the storage unit, the first external storage device, or the second external storage device to the removable medium attached to the second external storage device or deletes the content data when the elapsed time from the last access time and date with respect to the content data saved in the storage unit, the first external storage device, or the second external storage device is greater than or equal to a predetermined third threshold value greater than the second threshold value or when a free space of the second external storage device is smaller than or equal to a predetermined value.

6. The information processing apparatus according to claim 1, wherein when accepting a reproducing instruction on content data saved in the external storage device, the content management unit acquires the content data, which reproducing instruction is accepted, from the external storage device through the communication unit with the reproducing instruction as a trigger, and saves the content data in the storage unit.

7. A content management method, comprising the steps of:
receiving, by a content management unit of an information processing apparatus communicable with one or more external storage devices, a notification indicating that new content data is saved in the external storage device from the external storage device;
acquiring the new content data from the external storage device with the notification as a trigger, and saving the new content data in a storage unit of the information processing apparatus by the information processing apparatus; and
storing, in a management information storage unit of the information processing apparatus, management information including storage area information of content data saved in at least one of the storage unit or the external storage device; wherein the content management unit manages a storage area of the content data in the storage unit and the external storage device based on the management information stored in the management information storage unit;
wherein the external storage device includes:
a first external storage device, which access speed is slower than the storage unit; and
a second external storage device, which access speed is slower than the first external storage device, and
the content management unit determines, when moving the content data saved in the storage unit to one of the first external storage device or the second external storage device, whether or not the content data is saved in the other one of the first or the second external storage device based on the storage area information of the management information, and deletes the content data from the storage unit after copying the content data from the storage unit to the other one of the first or the second external storage device if the content data is not saved.

8. A non-transitory recording medium storing a program for causing an information processing apparatus communicable with one or more external storage devices to execute the steps of:
receiving, by a content management unit of the information processing apparatus, from the external storage device, a notification indicating that new content data is saved in the external storage device;
acquiring the new content data from the external storage device with the notification as a trigger, and saving the new content data in a storage unit of the information processing apparatus; and
storing, in a management information storage unit of the information processing apparatus, management information including storage area information of content data saved in at least one of the storage unit or the external storage device; wherein the content management unit manages a storage area of the content data in the storage unit and the external storage device based on the management information stored in the management information storage unit;
wherein the external storage device includes:
a first external storage device, which access speed is slower than the storage unit; and
a second external storage device, which access speed is slower than the first external storage device, and
the content management unit determines, when moving the content data saved in the storage unit to one of the first external storage device or the second external storage device, whether or not the content data is saved in the other one of the first or the second external storage device based on the storage area information of the management information, and deletes the content data from the storage unit after copying the content data from the storage unit to the other one of the first or the second external storage device if the content data is not saved.

* * * * *